(12) United States Patent
Sardari et al.

(10) Patent No.: US 10,449,440 B2
(45) Date of Patent: Oct. 22, 2019

(54) INTERACTIVE VOICE-CONTROLLED COMPANION APPLICATION FOR A VIDEO GAME

(71) Applicant: Electronic Arts Inc., Redwood City, CA (US)

(72) Inventors: Mohsen Sardari, Redwood City, CA (US); Kenneth Alan Moss, Redwood City, CA (US); Kazi Atif-Uz Zaman, Foster City, CA (US); Navid Aghdaie, San Jose, CA (US); John Kolen, Half Moon Bay, CA (US); Mohamed Marwan Mattar, San Francisco, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

(21) Appl. No.: 15/639,973

(22) Filed: Jun. 30, 2017

(65) Prior Publication Data

US 2019/0001219 A1 Jan. 3, 2019

(51) Int. Cl.
| | |
|---|---|
| *A63F 13/215* | (2014.01) |
| *A63F 13/79* | (2014.01) |
| *G06N 5/04* | (2006.01) |
| *G06N 20/00* | (2019.01) |
| *A63F 13/424* | (2014.01) |
| *A63F 13/352* | (2014.01) |
| *G06F 3/16* | (2006.01) |
| *A63F 13/45* | (2014.01) |
| *G10L 15/26* | (2006.01) |

(52) U.S. Cl.
CPC .......... *A63F 13/215* (2014.09); *A63F 13/352* (2014.09); *A63F 13/424* (2014.09); *A63F 13/79* (2014.09); *G06F 3/167* (2013.01); *G06N 5/04* (2013.01); *G06N 20/00* (2019.01); *A63F 13/45* (2014.09); *A63F 2300/6027* (2013.01); *G10L 15/26* (2013.01)

(58) Field of Classification Search
CPC ........ A63F 13/20; A63F 13/215; A63F 13/79; A63F 13/424; A63F 13/45
USPC .......................................................... 463/36
See application file for complete search history.

(56) References Cited

U.S. PATENT DOCUMENTS

| 7,369,997 B2 * | 5/2008 | Chambers | G10L 15/26 |
| | | | 704/275 |
| 8,443,288 B2 * | 5/2013 | Mercs | H04L 12/2803 |
| | | | 715/733 |
| 9,582,246 B2 * | 2/2017 | Klein | G06F 3/167 |
| 9,685,156 B2 * | 6/2017 | Borjeson | G10L 15/22 |
| 2004/0266527 A1 * | 12/2004 | Anderson | A63F 13/54 |
| | | | 463/36 |
| 2007/0244751 A1 * | 10/2007 | Zalewski | G06Q 30/02 |
| | | | 705/14.49 |

(Continued)

*Primary Examiner* — Chase E Leichliter
(74) *Attorney, Agent, or Firm* — Knobbe, Martens, Olson & Bear, LLP

(57) ABSTRACT

Using voice recognition, a user can interact with a companion application to control a video game from a mobile device. Advantageously, the user can interact with the companion application when the video game is unavailable because, for example, of the user's location. Moreover, machine learning may be used to facilitate generating voice responses to user utterances that are predicted to improve or maintain a user's level of engagement with the companion application, or its corresponding video game.

20 Claims, 9 Drawing Sheets

(56) References Cited

U.S. PATENT DOCUMENTS

| | | | |
|---|---|---|---|
| 2011/0212783 A1* | 9/2011 | Dale | H04L 67/1002 |
| | | | 463/42 |
| 2013/0090169 A1* | 4/2013 | Liu | A63F 13/12 |
| | | | 463/42 |
| 2014/0128144 A1* | 5/2014 | Bavitz | A63F 9/24 |
| | | | 463/23 |
| 2015/0035937 A1* | 2/2015 | Ota | H04N 7/15 |
| | | | 348/14.08 |
| 2015/0248886 A1* | 9/2015 | Sarikaya | G10L 15/1815 |
| | | | 704/257 |
| 2016/0203002 A1* | 7/2016 | Kannan | G06F 3/167 |
| | | | 715/708 |
| 2017/0052760 A1* | 2/2017 | Johnson | G06F 3/167 |
| 2017/0169829 A1* | 6/2017 | Celikyilmaz | G06F 17/2785 |
| 2019/0027131 A1* | 1/2019 | Zajac, III | G10L 15/02 |

* cited by examiner

INTERACTIVE VOICE-CONTROLLED COMPANION APPLICATION FOR A VIDEO GAME

BACKGROUND

Software developers typically desire for their software to engage users for as long as possible. The longer a user is engaged with the software, the more likely that the software will be successful. The relationship between the length of engagement of the user and the success of the software is particularly true with respect to video games. The longer a user plays a particular video game, the more likely that the user enjoys the game and thus, the more likely the user will continue to play the game.

The principle of engagement is not limited to single player games and can also be applied to multiplayer video games. Video games that provide users with enjoyable multiplayer experiences are more likely to have users play them again. Conversely, video games that provide users with poor multiplayer experiences are less likely to maintain a high number of users. Thus, one of the challenges of video game development is to provide a mechanism that ensures or increases the probability of an enjoyable gameplay experience.

SUMMARY OF EMBODIMENTS

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

In certain embodiments of the present disclosure, a computer-implemented method is disclosed. This method may be implemented by an interactive computing system configured with specific computer-executable instructions. The method may include receiving an utterance from a user computing device. The utterance may comprise one or more spoken words associated with a video game and spoken by a user. Further, the method may include determining an utterance classification for the utterance and, responsive to determining that the utterance classification corresponds to a command, the method may include determining the command referenced by the utterance. In addition, the method may include determining the video game associated with the command. The video game may be one of a plurality of video games. Moreover, the method may include identifying a user account associated with the user and identifying a host system associated with the video game and the user account. The host system may be configured to host at least a first portion of an instance of the video game. In addition, the method may include loading a user game account associated with the user account at the host system and executing the command on behalf of the user with respect to the user game account of the user at the host system without the user accessing the video game.

In certain embodiments, the method further includes determining a priority of the utterance processing the utterance in accordance with the priority of the utterance. Processing the utterance in accordance with the priority of the utterance may include providing the utterance to a secondary processing system to process the utterance when the priority is below a threshold priority. In some embodiments, the utterance may be received from a companion application hosted by the user computing device. The companion application may be distinct from but associated with the video game.

In certain embodiments, executing the command on behalf of the user may comprises instantiating a headless client configured to execute at least a second portion of the instance of the video game, executing the second portion of the instance of the video game at the headless client, and executing the command at the headless client. Moreover, responsive to determining that the utterance classification corresponds to a query, the method may further include accessing one or more knowledge sources associated with the query. At least one of the one or more knowledge sources may comprise a repository of game-state information. Further, the method may include generating a query response to the query based at least in part on data obtained from the one or more knowledge sources and transmitting the query response to the user computing device. Generating the query response may comprise accessing user interaction data for the user, determining a plurality of eligible query responses based at least in part on the data obtained from the one or more knowledge sources, and generating a score for each of the eligible query responses based on the user interaction data and a parameter function. The parameter function may be generated based at least in part on a machine learning algorithm. Moreover, the method may include selecting the query response from the plurality of eligible query responses based at least in part on the score for each of the eligible query responses. In addition, the method may include determining one or more features of a signal corresponding to the utterance. Generating the score for each of the eligible query responses may be further based on the one or more features of the signal corresponding to the utterance. In some embodiments, selecting the query response from the plurality of eligible query responses comprises selecting the query response that is more likely to increase engagement from the user compared to the remaining eligible query responses from the plurality of query responses.

In certain embodiments, responsive to determining that the utterance classification corresponds to a statement, the method further includes applying the statement to a parameter function to determine an action. The action may be selected from a plurality of actions to maintain or increase a level of engagement of the user with respect to the video game. Further, the method may include performing the action with respect to execution of the instance of the video game. Applying the statement to the parameter function to determine the action may comprise applying a plurality of statements corresponding to a plurality of utterances to the parameter function. Moreover, the method may further include performing voice recognition on the utterance to determine the one or more spoken words.

Certain embodiments of the present disclosure relate to a system. The system may include an application host system configured to host at least a first portion of the video game and an interactive computing system comprising one or more hardware processors. The interactive computing system may be configured to execute specific computer-executable instructions to at least receive an utterance from a user computing device. The utterance may be associated with a video game and spoken by a user. Further, the system may determine an utterance classification for the utterance and responsive to determining that the utterance classification corresponds to a command determine the command referenced by the utterance. In addition, the system may determine the video game associated with the command. The video game may be one of a plurality of video games. In addition, the system may identify a user account associated with the user, identify the application host system associated with the video game and the user account from a plurality of application host systems, load a user game account associated with the user account at the application host system, and execute the command on behalf of the user with respect to the user game account of the user at the application host system.

In certain embodiments, the interactive computing system is further configured to execute the command on behalf of the user by instantiating a headless client configured to execute at least a second portion of the instance of the video game, executing the second portion of the instance of the video game at the headless client, and executing the command at the headless client. Responsive to determining that the utterance classification corresponds to a query, the interactive computing system may be further configured to execute specific computer-executable instructions to at least access one or more knowledge sources associated with the query, generate a query response to the query based at least in part on data obtained from the one or more knowledge sources, and transmit the query response to the user computing device. In some embodiments, the interactive computing system may be further configured to generate the query response by accessing user interaction data for the user, determining a plurality of eligible query responses based at least in part on the data obtained from the one or more knowledge sources, and generating a score for each of the eligible query responses based on the user interaction data and a parameter function. The parameter function may be generated based at least in part on a machine learning algorithm. Moreover, the system may be further configured to select the query response from the plurality of eligible query responses based at least in part on the score for each of the eligible query responses.

In certain embodiments, responsive to determining that the utterance classification corresponds to a statement, the interactive computing system is further configured to execute specific computer-executable instructions to at least apply the statement to a parameter function to determine an action and perform the action with respect to execution of the instance of the video game. In some embodiments, the interactive computing system is further configured to apply the statement to the parameter function by receiving a plurality of statements, including the statement, from the user computing device, determining a sentiment of each of the plurality of statements, aggregating the sentiments of each of the plurality of statements to obtain an aggregated sentiment, and providing the aggregated sentiment to the parameter function.

Certain embodiments of the present disclosure relate to a non-transitory computer-readable storage medium storing computer executable instructions that, when executed by one or more computing devices, configure the one or more computing devices to perform particular operations. These operations may include receiving an utterance from a user computing device. The utterance may be associated with a video game. Further, the operations may include determining that the utterance classification corresponds to a command, identifying the command referenced by the utterance, identifying a user account of the video game that corresponds to an identifier received with the utterance, and selecting a host system for the video game based at least in part on the user account. The host system may be configured to host at least a first portion of an instance of the video game. In some cases, the operations may include loading game data associated with the user account at the host system and executing the command on the instance of the video game at the host system on behalf of a user associated with the user account without the user accessing the video game.

In certain embodiments, executing the command comprises instantiating a headless client configured to execute at least a second portion of the instance of the video game, executing the second portion of the instance of the video game at the headless client, and executing the command at the headless client.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Introduction

Figure 1A:
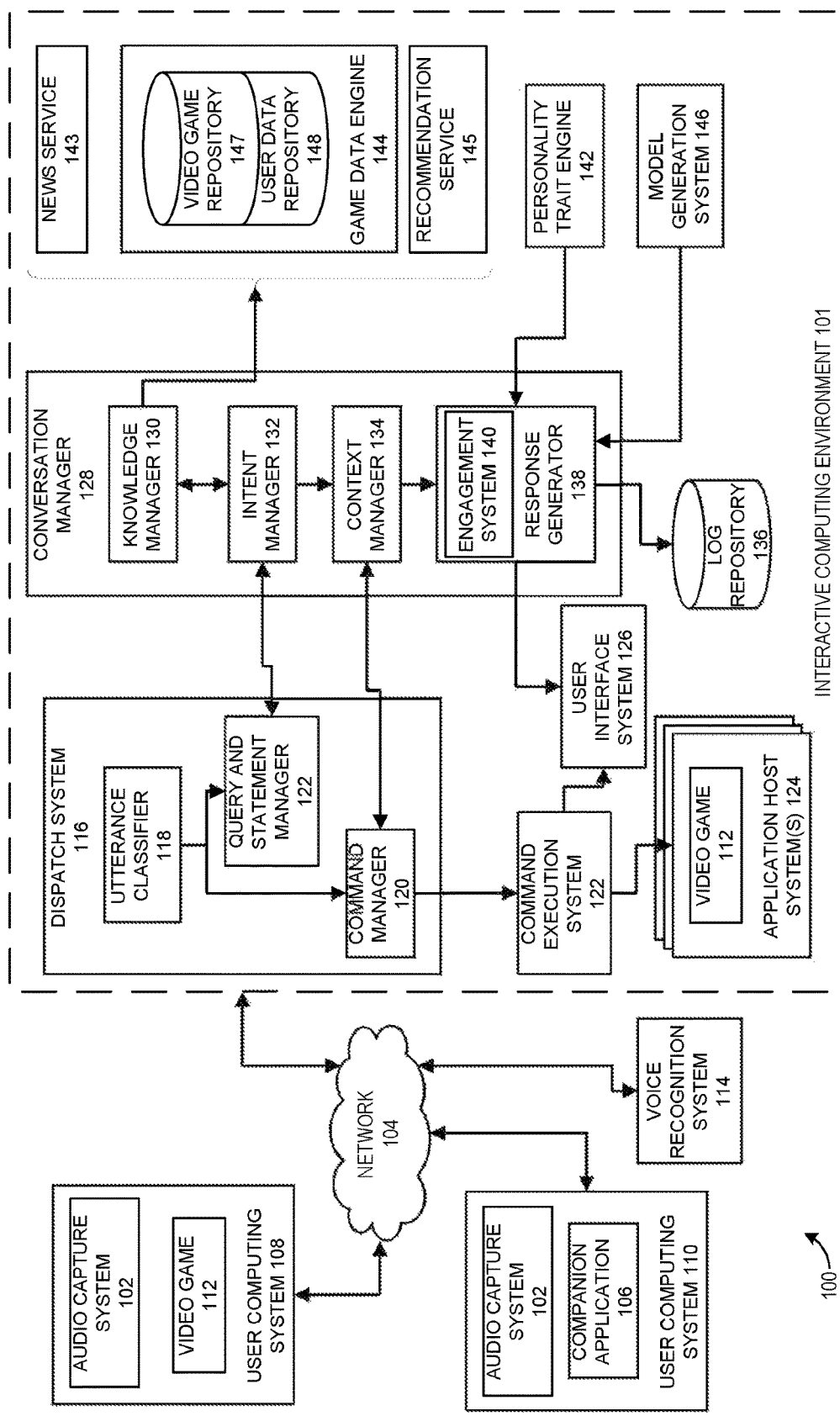
FIG. 1A illustrates an embodiment of a networked computing environment that can implement one or more embodiments of a companion application system for a video game.

It is generally desirable for a video game to appeal to a large number of users. Further, it is desirable for a video game to maintain engagement with a user so that the user continues to play or use the video game over multiple game sessions or for an extended period of time. There are often periods of time when a user is not able to play a video game. For example, the user may have responsibilities, such as work, school, family obligations, and the like. In some cases, the user's additional responsibilities may prevent the user from accessing or using a video game system or other host computing system the hosts of video game.

Embodiments presented herein use an interactive companion application that is associated with the video game to maintain user engagement during periods of time when the user is unable to interact with the video game. The companion application enables a user to interact with at least a portion of the video game without executing the video game itself. For example, the companion application enables a user to make changes to a user's character or team, buy or sell digital items that the user may use when playing the video game, instruct a user's character or team to take an action or to travel to a location within the video game, or to assign skill points earned in the video game to different aspects of an in-game character. Further, the user can use the companion application to obtain information about the video game, such as the status of the user's character, a list of available missions, or the number of users currently playing the video game or currently playing the video game in a particular host server.

In some cases, the companion application executes or enables a user to play meta-games or mini-games that are related to a video game. Some of these mini-games may affect the video game. For example, a user could play a mini-game that enables the user to obtain or unlock special items, weapons, avatars, skill points, or character costumes that can then be used in the video game when the user plays the video game. Often, the mini-games may be associated with lower system requirements than an associated video game enabling the mini-games to be played on devices that may not be capable of executing the associated video game.

In certain embodiments, the companion application may generate a response to a user's voice input. The companion application may determine a response that will maximize or improve the user's engagement. The determination of a response that may improve the user's engagement may be determined based on an analysis of voice input or utterances provided by the user. Using one or more machine learning algorithms, a prediction model or parameter function within objective of increasing user engagement may be determined based on historical interactions. The historical interactions, which may include historical user information or historical utterances, may be fed into the machine learning system that generates the prediction model that predicts an expected level of user engagement or retention rate relative to a historical set of users who have previously played the video game. In some cases, the objective function for generating the prediction model may be optimized for an objective other than user engagement. For example, the objective function may be associated with user behavior to other users.

Advantageously, in certain embodiments, the companion application may be a "light" or "lite" application that may require fewer resources to execute than some video games, thereby enabling the companion application to operate on a wider variety of computing systems including computer systems that may be unable to host the video game. For example, the companion application may operate on a smart phone or a computing device that has less computational resources that may be required to execute the video game. Further, in some cases, the companion application may operate at least partially over a network or as part of a cloud service. In some such cases, a user may interact with the companion application via a voice controlled speaker, such as the Amazon Echo® or Google Home™ devices.

In some embodiments, the voice control features disclosed herein can be used to interact with a video game while it is executing. For example, the voice control features may be used to control a non-player character (NPC) while a user is controlling a playable character via a gamepad or other user input device.

To simplify discussion, the present disclosure is primarily described with respect to a video game. However, the present disclosure is not limited as such and may be applied to other types of applications. For example, embodiments disclosed herein may be applied to educational applications (for example, applications that help users learn a new language) or other applications where maintaining user engagement can be important.

Example Networked Computing Environment

FIG. 1A illustrates an embodiment of a networked computing environment 100 that can implement one or more embodiments of a voice-controlled companion application 106. The networked computing environment 100 includes a user computing system 110 that can communicate with an interactive computing system 101 via a network 104. Further, the networked computing environment 100 may include a number of additional user computing systems, such as but not limited to the user computing system 108. At least some of the additional user computing systems may be configured the same as or similarly to the user computing system 110.

User computing system 110 may include, host, or execute a companion application 106. The companion application 106 may include any type of application that enables a user to interact with the video game without executing the video game. For example, the companion application 106 may enable a user to access an auction house associated with the video game. As another example, the companion application 106 may enable a user to trade characters, obtain in game items, sell in game items, reconstitute a user's character squad, obtain tips or advice for playing the video game, obtain game news, subscribe to missions within the game, or perform any other action or query that may be performed without the user accessing an instance of the video game itself. Additional examples of interactions with the video game 112 that may occur via the companion application are provided herein with respect to Table 1 introduced with respect to FIG. 2 below. Some of the interactions may not require interacting with the video game 112 itself, but may provide information about the video game 112 or may interact with other applications that can affect the play of the video game 112. The companion application 106 may not be a game itself, but may be capable of providing information about a video game 112 or the ability to make changes to elements of the video game 112. In other embodiments, the companion application 106 may include game features. For example, the companion application 106 may provide access to mini games whose outcomes may or may not affect the video game 112.

The user computing system 110 may further include an audio capture system 102 that can capture one or more utterances made by a user interacting with the user computing system 110. The audio capture system may receive utterances from one or more microphones. Further, the audio capture system 102 may convert the one or more utterances into one or more words, commands, or speech. The words may be in one or multiple languages. Further, the words may include fictitious words that are associated with the video game 112. In some embodiments, the audio capture system 102 may interact with a cloud or network-based system to facilitate recognizing utterances spoken by user. For example, the audio capture system 102 may interact with a voice recognition system 114 that can convert a captured utterance into one or more words. The audio capture system 102 may receive, via a microphone, utterances or audio from a user. This captured audio may be transmitted to the voice recognition system 114. In some cases, the captured audio may be processed by the companion application 106, or by an audio processing system on the user computing system 110 before it is provided to the voice recognition system 114. For example, one or more noise filtering processes may be performed before transmitting the audio to the voice recognition system 114.

The voice recognition system 114 may be or may include an audio or voice analysis system capable of parsing the audio captured by the audio capture system 102 into words or other recognized sounds. The parsed words may be provided back to the user computing system 110 for use by the companion application 106. Alternatively, or in addition, the parsed words may be provided to the dispatch system 116 for processing in accordance with the embodiments described herein.

The utterances captured by the audio capture system 102 via the companion application 106 may be provided to a dispatch system 116 of an interactive computing environment 101 via the network 104. The dispatch system 116 may include one or more computing systems including one or more hardware processors that can analyze the received utterances to determine one or more actions to perform in response to the utterances. The dispatch system 116 may include a number of subsystems to facilitate responding to the received utterances. For example, the dispatch system 116 may include an utterance classifier 118, a command manager 120, and a query and statement manager 122.

The utterance classifier 118 can determine whether the utterance is a command, a query, or a statement. In some embodiments, the utterance classifier may utilize a machine learning system that determines the classification of the utterance based at least in part on training data obtained or captured previously or at an earlier point in time. Further, in certain embodiments, the utterance classifier 118 can determine a priority level of the utterance. Based on the priority level of the utterance, the dispatch system 116 can determine whether to process the utterance, when to process the utterance, or whether to provide the utterance to a secondary computing system (not shown) for processing.

The command manager 120 can process utterances that the utterance classifier 118 has determined to be a command. In some embodiments, certain commands may be preloaded or otherwise recognized by the command manager 120. The command manager 120 may be capable of executing the preloaded commands in conjunction with a command execution system 122. In some embodiments, commands may include any action that requires or causes a change in the state of a video game on a user computing system 108 or an application host system 124. Commands that are not recognized by the command manager 120 may be provided to a context manager 134 at a conversation manager 128. The context manager 134 may identify the command from the utterance and may provide the identity of the command, and in some cases context information for executing the command, to the command manager 120. The command manager 120 may then execute the command in conjunction with the command execution system 122.

The command execution system 122 may execute the command at the video game 112. Executing the command may include identifying an application host system 124 that hosts the video game 112. Further, in some cases, executing the command may include instantiating a headless client to execute the command at the application host system 124. The headless client may represent the user computing system 108 and may execute a portion of the video game 112 that is normally executed at the user computing system 108, such as a client portion of the video game 112, while the server portion of the video game is executed at the application host system 124. The headless client may include or be executed on a computing system that is configured to operate without a monitor or without displaying graphics from the video game 112. The headless client may be controlled or initiated by the command execution system 122. In some cases, once the headless client is initiated by the command execution system 122, it may execute a portion of the video game 112 in conjunction with a portion of the video game 112 hosted by the application host system. The headless client may serve as a substitute for the user computing system 108 or 110 and may interact with the application host system 124 to enable execution of the video game 112. Thus, a fully functional instance of the video game 112 may be executed at the headless client or at a combination of the headless client and the application host system 124 without displaying or outputting user interface data including graphics or audio. Advantageously, in certain embodiments, the use of the headless client enables commands referenced in utterances obtained by the companion application 106 to be executed without a user interacting with the video game 112.

A result of executing the command may be output by the user interface system 126. The user interface system 126 may transmit audio, video, or images to the user computing system 110 for presentation to a user via the companion application 106. In some cases, the output may be presented by the video game 112 at the user computing system 108.

Utterances that are determined to not be a command, such as those that are queries or statements, may be provided to the query and statement manager 122. The query and statement manager 122 may include a management system for managing processing of utterances that are queries or statements. The query and statement manager 122 may provide the utterances to an intent manager 132. The intent manager 132 may include a system for determining whether the utterance is a query or statement. Further the intent manager 132 may determine features of the utterance that may indicate a user's state of mind. The user's state of mind may be used for determining how to respond to the user's utterance or what form a response to a user's utterance should take.

The features of the utterance may include characteristics of the utterance that indicate a user's state of mind. These characteristics may be derived from features of an audio or speech signal corresponding to the utterance. The features may be temporal or spectral features of the audio or speech signal. For example, the characteristics may include a tone of the utterance that can be determined from frequency measurements of the utterance. A higher pitch may indicate a greater level of excitement from the user. The features of the utterance can be compared to a baseline for a particular user to account for differences in tone between different users. Further, the baseline for the particular user may be used to determine a difference between an unexcited tone of voice and excited tone of voice for the user.

The conversation manager 128 may further include a knowledge manager 130. The knowledge manager 130 may be used to identify information responsive to a query included in the utterance. The knowledge manager 130 can access one or more knowledge repositories to obtain information responsive to the query. Further, in some cases, the knowledge manager 130 may access one or more additional systems to obtain information responsive to the query. Some non-limiting examples of systems and repositories that the knowledge manager may access to obtain information responsive to the query include a news service 143, a game data engine 144, and a recommendation service 145.

The news service 143 may include any system that can provide news about a video game 112 or a publisher of the video game 112. For example, a user could ask whether there are any new patches being released for a video game 112, whether there is new downloadable content for the video game 112, whether the publishers releasing a sequel to the video game 112, or the like. Further, the news service may include information about promotions relating to the video game 112. These promotions may be for additional products, such as expansions, downloadable content (DLC), or sequels. Alternatively, or in addition, the promotions may be for in-game content, such as discounts on in-game items, discounts on in-game credits, bonus experience points for a limited time, and the like.

The game data engine 144 can include any system that can provide information specific to the state of the video game 112 or the execution of the video game 112. For example, the game data engine 144 may include a video game repository 147 that can provide information on items or playable characters that are available in the video game 112. As another example, the video game repository 147 may provide information about available missions or locations within the video game 112. In some cases, the information provided by the game data engine 144 may be specific to a particular user. For example, the missions available to a user of the video game 112 may be user specific. In some embodiments, the game data engine 144 may also be able to obtain information about one or more application host system 124. For example, the game data engine may determine the load on the difference application host systems 124, whether particular users are online or are on a particular application host system 124, or which application host system 124 may have particular features available for the video game 112.

Further, the game data engine 144 may include a user data repository 148 that provides information specific to the user account of the video game 112. For example, the user data repository 148 may identify characters available to a user of the video game 112, items owned by the user of the video game 112, or credits available to a user of the video game 112. As additional examples, the user data repository may include information about how often a user played the video game 112, how the user's score compares to other users, or any other information relating to the user's interaction with the video game 112.

The recommendation service 145 may include any system that can generate a recommendation related to the video game 112. The recommendation may be associated with the user's access of the video game 112 or playing the video game 112. For example, recommendation may be related to items that a user should attempt to obtain, missions that the user should attempt to play, or a play style that the user should adopt when playing the video game 112. Alternatively, or in addition, the recommendations may relate to other games or applications that a user may be interested in based on the user's play of the video game 112. For example, the recommendation service 145 may recommend other video games that are similar in type to the video game 112, new sources that may interest the user based on the user's interests in video game 112, or upcoming video game conventions that may interest the user.

The conversation manager 128 may further include a context manager 134. The context manager 134 may include any system that can determine commands referenced by an utterance. In some embodiments, the context manager may use a history of previous conversations or utterances, provided attributes, and determined responses to facilitate determining a command referenced by an utterance. The context manager 134 can identify parameters for executing the command and can provide the parameters to the command manager 120 for executing the command using the command execution system 122. In some embodiments, the context manager 134 can preload or predict commands that may be requested by a user and can provide parameters or information for executing the command to the command manager 120 in advance of an utterance requesting the command be performed. Advantageously, in certain embodiments, preloading or predicting commands can reduce time delay for time-sensitive commands or to satisfy low-latency requirements of particular commands. In some cases, the time-sensitive or low-latency required commands may be preloaded. The commands predicted to be performed may be predicted based at least in part on historical data. In some embodiments commands may be predicted to be performed based at least in part on one or more previous utterances of the user. For example, if the user requests cost information for a particular item, the context manager 134 may predict that the user may request that the item be purchased from an auction house. The context manager 134 may then preload at the command manager 120 an application programming interface (API) call or additional information required for purchasing the item from the auction house. Advantageously, in certain embodiments, by predicting commands and/or preloading information for performing commands at the command manager 120, the responsiveness of the dispatch system 116 can be improved by reducing the latency in executing a requested command.

The conversation manager 128 may generate a response to an utterance using the response generator 138. The response generator 138 may include any system that can generate a response or an utterance. In some embodiments, the response generator 138 may include an engagement system 140 that can evaluate effect on engagement of the user of one or more potential responses to an utterance. The engagement system 140 may apply one or more parameter functions or prediction functions generated using machine learning techniques to predict and impact on engagement of the potential response to an utterance. The parameter functions may be generated using training data by the model generation system 146, which is described in more detail below with respect to FIG. 1B.

In some embodiments, the response to an utterance may be modified to reflect a particular personality type. The personality trait engine 142 can modify the utterance to reflect a particular personality that is determined to improve the engagement of the user. For example, if the engagement system 140 determines that a more lighthearted response for a particular user will result in improved engagement compared to a more serious response, the personality trait engine 142 may modify a response generated by the response generator 138 to be more lighthearted. Further, the personality trait engine 142 may insert a joke into the response to the utterance.

A response generated by the response generator 138 may be output by the user interface system 126 to a user computing system 110. Further, the response generator 138 may store utterances received at the dispatch system 116 and responses to the utterances in the log repository 136. Information stored in the log repository 136 may be used to update parameter models for prediction models generated by the model generation system 146.

Although not illustrated, the networked computing environment 100 may further include one or more management or administration computing systems that can be used to interact with the interactive computing environment 101. Using the management computing systems, a user, such as administrator, can perform maintenance tasks with respect to the interactive computing environment 101. For example, an administrator may update one or more of the knowledge management systems, such as the news service 143, to have access to the latest news related to the video game 112.

Further, although the dispatch system 116 in the conversation manager 128 are illustrated as separate systems, in certain embodiments the dispatch system 116 and/or the conversation manager 128 may be included as part of the video game 112. For example, the conversation manager 128 may be included as part of the portion of the video game 112 hosted by the application host system 124.

Each of the systems illustrated in the networked computing environment 100 may be implemented as computer hardware. However, in certain embodiments, some of the systems may be implemented as software or a combination of hardware and software. For example, the utterance classifier 118 may be software that's implemented by one or more hardware processors of the dispatch system 116.

In some embodiments, the utterances captured by the audio capture system 102 may be used to interact with the video game 112 instead of or in addition to an instance of the companion application 106. For example, the user computing system 108 may capture utterances using an audio capture system 102. These utterances may then be used to interact with the video game 112, such as to command an NPC of the video game 112.

The user computing systems 108 and 110 may include hardware and software components for establishing communications over a communication network 104. For example, the user computing systems 108 and 110 may be equipped with networking equipment and network software applications (for example, a web browser) that facilitate communications via a network (for example, the Internet) or an intranet. The user computing systems 108 and 110 may have varied local computing resources, such as central processing units and architectures, memory, mass storage, graphics processing units, communication network availability and bandwidth, and so forth. Further, the user computing systems 108 and 110 may include any type of computing system. For example, the user computing system 108 and 110 may include any type of computing device(s), such as desktops, laptops, video game platforms, television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few. In certain embodiments, the video game 112 may execute on a video game console. In some such cases, user utterances or input may be received via a gamepad input. In some embodiments, the user computing systems 108 and 110 may include one or more of the embodiments described below with respect to FIG. 6 and FIG. 7.

The model generation system 146 can use one or more machine learning algorithms to generate one or more prediction models or parameter functions. One or more of these parameter functions may be used to determine an expected value or occurrence based on a set of inputs. For example, a prediction model can be used to determine an expected engagement level or a probability that a user will continue to play the video game 112 based on one or more inputs to the prediction model, such as, for example, historical user interaction information for a user or historical utterances made by the user. As further examples, a prediction model can be used to determine a retention rate or an expected amount of money spent by the user on purchasing in-game items for the video game based on one or more inputs to the prediction model. In some cases, the prediction model may be termed a prediction model because, for example, the output may be or may be related to a prediction of an action or event, such as the prediction the user continues to play the video game 112. A number of different types of algorithms may be used by the model generation system 146. For example, certain embodiments herein may use a logistical regression model. However, other models are possible, such as a linear regression model, a discrete choice model, or a generalized linear model.

The machine learning algorithms can be configured to adaptively develop and update the models over time based on new input received by the model generation system 146. For example, the models can be regenerated on a periodic basis as new user information is available to help keep the predictions in the model more accurate as the user information evolves over time. The model generation system 146 is described in more detail herein. After a model is generated, it can be provided to the engagement system 140.

Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

The engagement system 140 can include one or more systems for determining a level of engagement for a user based on the application of user utterances and/or user interaction data for the user to a prediction model generated by the model generation system 146. In some cases, the response generator 138 may use the expected engagement level determined by the engagement system 140 to determine the type of response, the tone of a response, or the information to include in a response to an utterance.

The network 104 can include any type of communication network. For example, the network 104 can include one or more of a wide area network (WAN), a local area network (LAN), a cellular network, an ad hoc network, a satellite network, a wired network, a wireless network, and so forth. Further, in some cases, the network 104 can include the Internet.

Example Model Generation System

Figure 1B:
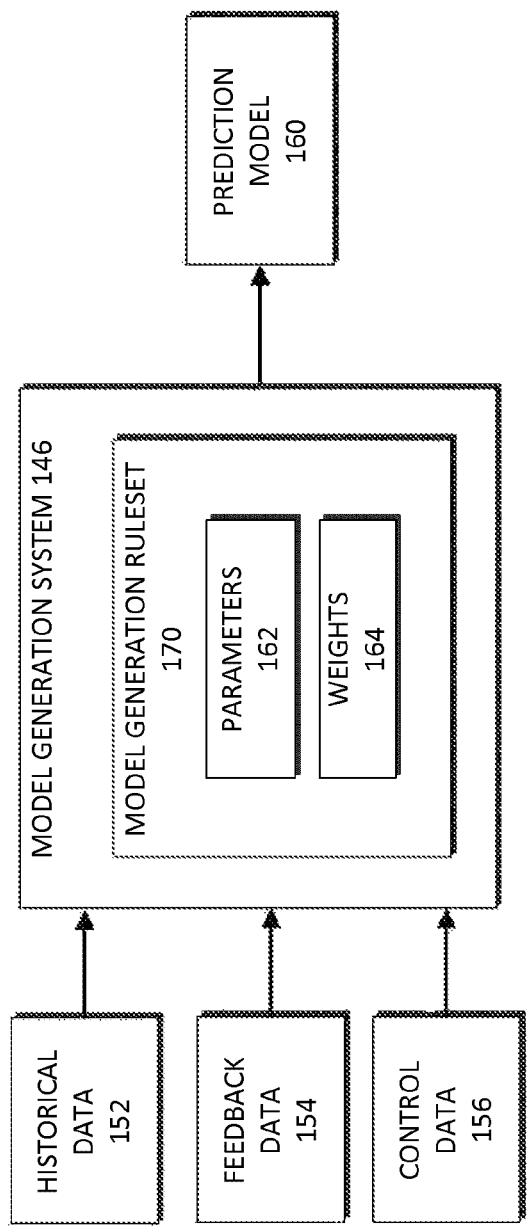
FIG. 1B illustrates an embodiment of a model generation system of FIG. 1A.

FIG. 1B illustrates an embodiment of the model generation system 146 of FIG. 1A. The model generation system 146 may be used to determine one or more prediction models 160 based on historical data 152 for a number of users. Typically, although not necessarily, the historical data 152 includes data associated with a large number of users, such as hundreds, thousands, hundreds of thousands, or more users. However, the present disclosure is not limited as such, and the number of users may include any number of users. Further, the historical data 152 can include data received from one or more data sources, such as, for example, one or more application host systems 124 and/or one or more user computing systems 108 and/or 110. Moreover, the historical data 152 can include data from different data sources, different data types, and any data generated by one or more user's interaction with the video game 112 and/or the companion application 106. In some embodiments, the historical data 152 may include a very large number of data points, such as millions of data points, which may be aggregated into one or more data sets. In some cases, the historical data 152 may be accessed from a user data repository 148. In some embodiments, the historical data 152 is limited to historical information about the video game 112 or companion application 106, but in other embodiments, the historical data 152 may include information from one or more other video games or companion applications. Further, in some embodiments, one or more subsets of the historical data are limited by a date restriction, such as for example, limited to include only data from the last 6 months.

The historical data 152 may include user interaction data for the users with respect to the video game 112 or the companion application 106. Further, the historical data 152 may include information relating to how different users reacted to responses generated by the dispatch system 116 or the conversation manager 128 to utterances spoken by the users.

The model generation system 146 may, in some cases, also receive feedback data 154. This data may be received as part of a supervised model generation process that enables a user, such as an administrator, to provide additional input to the model generation system 146 that may be used to facilitate generation of the prediction model 160. For example, if an anomaly exists in the historical data 152, the user may tag the anomalous data enabling the model generation system 146 to handle the tagged data differently, such as applying a different weight to the data or excluding the data from the model generation process.

Further, the model generation system 146 may receive control data 156. This control data 156 may identify one or more features or characteristics for which the model generation system 146 is to determine a model. Further, in some cases, the control data 156 may indicate a value for the one or more features identified in the control data 156. For example, suppose the control data 156 indicates that a prediction model is to be generated using the historical data 152 to determine a length of time (which may serve as a measure of engagement) that the users played the video game 112. If the amount of time each user played the game is known, this data may be provided as part of the control data 156, or as part of the historical data 152. As another example, if the prediction model is to be generated to estimate a retention rate as determined, for example, based on whether the users played the video game 112 for a threshold period of time or continue to play the video game 112 after a particular threshold period of time, the control data 156 may include the retention rate and a history of interactions with the companion application 106 for the users whose data is included in the historical data 152.

The model generation system 146 may generally include a model generation rule set 170 for generation of the prediction model 160. The rule set 170 may include one or more parameters 162. Each set of parameters 162 may be combined using one or more mathematical functions to obtain a parameter function. Further, one or more specific parameters may be weighted by the weights 164. In some cases, the parameter function may be obtained by combining a set of parameters with a respective set of weights 164. The prediction model 160 and/or the respective parameters 162 of the prediction models 160 may be derived during a training process based on particular input data, such as the historical data 152, feedback data 154, and control data 156, and defined output criteria, which may be included with the control data 156, used for training purposes. The model generation rule set 170 can define the specific machine learning rules and/or algorithms the model generation system 146 uses to generate the model based on a defined objective function, such as determining a churn rate. In some embodiments, initial parameters 162 and weights 164 can be manually provided during the initiation of the model generation process. The parameters 162 and weights 164 can be updated and modified during the model generation phase to generate the prediction model 160. In some embodiments, weights may be applied to the parameter functions or prediction models themselves. For example, the mathematical complexity or the number of parameters included in a particular prediction model 160 may affect a weight for the particular prediction model 160, which may impact the generation of the model and/or a selection algorithm or a selection probability that the particular prediction model 160 is selected.

The model generation system 146 can filter and categorize the historical data sets according to various characteristics and parameters of the data. For example, the data can be categorized by the data source (such as, for example, companion application interaction data, game application data, host application data, or user profile data), information type (such as, for example, utterance commands, utterance statements, utterance queries, gameplay information, transaction information, interaction information, or game account information), opponent data (such as, for example, skill of opponent, role selected or played by opponent, or success rate verse opponent), teammate data (such as, for example, skill of teammates, roles selected or played by teammates, or success rate when playing with a particular teammate) or other categories associated with the data. The model generation system 146 can filter the information to identify the information for further processing. In some embodiments, the model generation system 146 is configured to filter and separate the historical data 152 into a plurality of data types or categories before further processing. Moreover, in some cases, some of the historical data 152 may be filtered out or removed from the historical data 152 based on the data being associated with a relevance that does not satisfy a threshold relevance as determined by the model generation system 146.

After the prediction model 160 has been generated, the model can be used during runtime of the engagement system 140 and/or the response generator 138 to approve, reject, or select a response to an utterance received from a user of the companion application 106 or the video game 112. In some cases, the prediction model 160 may be used to facilitate generating an audio or visual response to an utterance, or an action performed in response to an utterance. In other cases, the prediction model 160 may be use to confirm whether a particular response to an utterance satisfies a set of conditions, such as, for example, a particular threshold engagement rate.

Example Engagement System

Figure 1C:
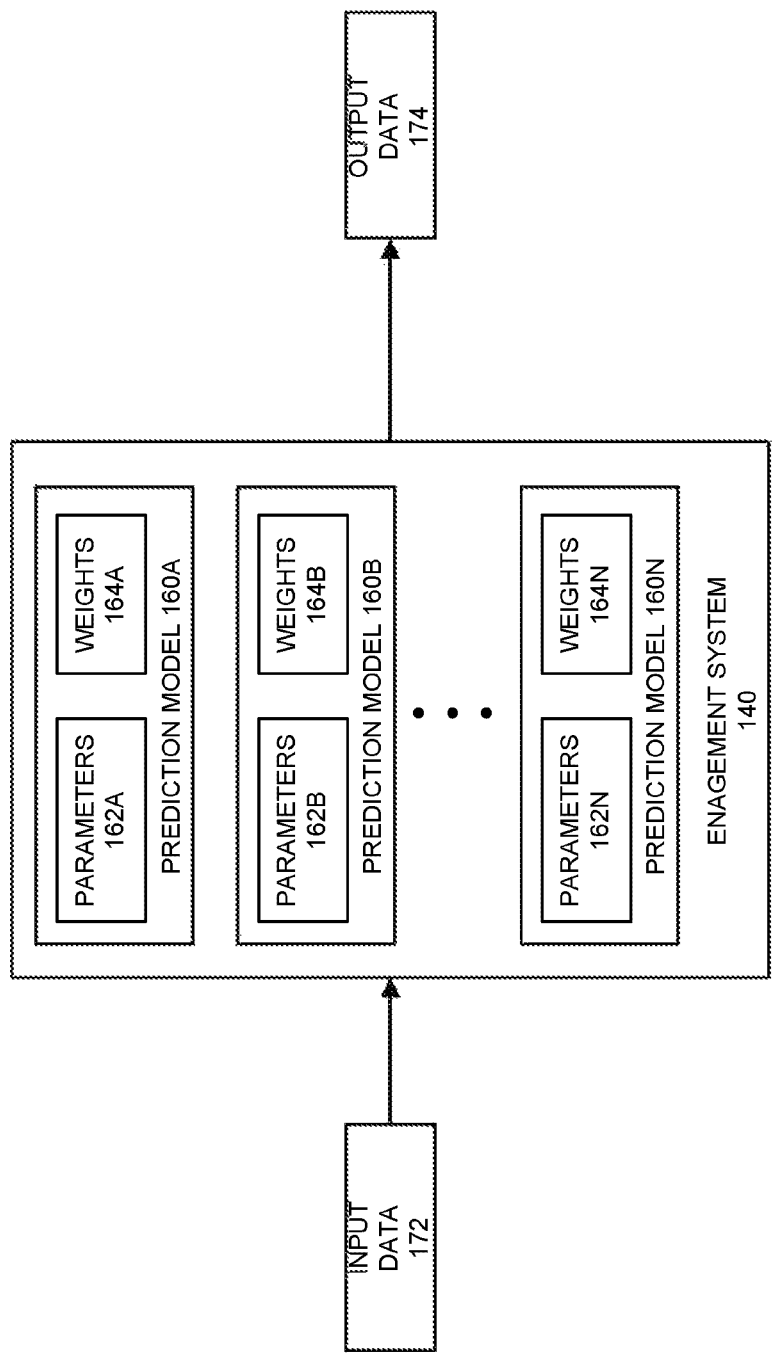
FIG. 1C illustrates an embodiment of an engagement system of FIG. 1A.

FIG. 1C illustrates an embodiment of an engagement system 140 of FIG. 1A. The engagement system 140 can apply or use one or more of the prediction models 160 generated by the model generation system 146. Although illustrated as a separate system, in some cases, the features of the engagement system 140 are performed by the response generator 138. The engagement system 140 may use one or more prediction models 160A, 160B, 160N (which may be referred to collectively as "prediction models 160" or in the singular as "prediction model 160") to process the input data 172 to obtain the output data 174.

The engagement system 140 may apply the prediction model(s) 160 during determination of a response to an utterance received from a companion application 106 or a video game 112. In some embodiments, the prediction models 160 are applied after receipt of a plurality of utterances. For example, a series of statements may be captured by the audio capture system 102 and aggregated by the conversation manager 128. The aggregated series of statements may be applied to the prediction model 160 to determine an expected level of engagement, whether to take an action responsive to the statements, or what action to take, if any, responsive to the statements. In some cases, the prediction models 160 are applies to statements after a trigger occurs. For example, the statements may be applied to the prediction models 160 to determine an engagement level or expected retention rate for a user after the user has lost a series of matches. When applying utterances to the prediction model 160, additional input data 172 may also be supplied. The input data 172 can include one or more pieces of data associated with a user who is playing the video game 112 or the companion application 106, or has indicated a desire to play an instance of the video game 112. This data may include user interaction data for the companion application 106, user interaction data for the video game 112, profile data for the user, and any other data that may be applied to the prediction model 160 to determine an engagement level, or a retention or churn rate for the user. Further, the input data 172 can include one or more pieces of data associated with one or more additional users who may be selected as opponents and/or teammates of the user. The data associated with the additional users may include the same type of data as received for the user, a subset of the type of data received for the user, and/or additional types of data than that received for the user. In some embodiments, the input data 172 can be filtered before it is provided to the engagement system 140.

In some embodiments, a single prediction model 160 may exist for the engagement system 140. However, as illustrated, it is possible for the engagement system 140 to include multiple prediction models 160. The engagement system 140 can determine which detection model, such as any of models 160A-N, to use based on input data 172 and/or additional identifiers associated with the input data 172. Additionally, the prediction model 160 selected may be selected based on the specific data provided as input data 172. The availability of particular types of data as part of the input data 172 can affect the selection of the prediction model 160. For example, the inclusion of demographic data (for example, age, gender, first language) as part of the input data may result in the use of prediction model 160A. However, if demographic data is not available for a particular user, then prediction model 160B may be used instead. In some cases, the input data 172 may include a response option, such as the contents of a response or a tone of the response, that may be supplied to a user in response to a received utterance.

he output data 174 can be an expected engagement level associated with a length of time that the user will continue to play the video game 112. Alternatively, or in addition, the output data 174 can be a retention rate or churn rate associated with a prediction that a user, or a set of users, ceases to play the video game 112. For example, in some embodiments, the engagement level may be between 0 and 100 indicating the predicted percentage of users associated with similar or the same data as included as input data 172 who would return for a subsequent play session of the video game 112 within a threshold time period. In some cases, the output data 174 may also identify a reason for the engagement level. For example, the engagement system 140 may indicate that the 90% engagement level for a particular user is based at least in part on the tone of utterances made via the companion application 106. However, the engagement system 140 may indicate that the 90% engagement level for another user may be based at least in part on the below freezing temperature in the geographic region where the user is located. As another example, the engagement system 140 may indicate that the 20% engagement level for a user may be based at least in part on the lack of missions available for the user's skill level.

The prediction models 160A, 160B, 160N may generally include a set of one or more parameters 162A, 162B, 162N, respectively (which may be referred to collectively as "parameters 162"). Each set of parameters 162 (such as parameters 162A) may be combined using one or more mathematical functions to obtain a parameter function. Further, one or more specific parameters from the parameters 162A, 162B, 162N may be weighted by the weights 164A, 164B, 164N (which may be referred to collectively as "weights 164"). In some cases, the parameter function may be obtained by combining a set of parameters (such as the parameters 162A) with a respective set of weights 164 (such as the weights 164A).

Example Process for Utterance Processing

Figure 2:
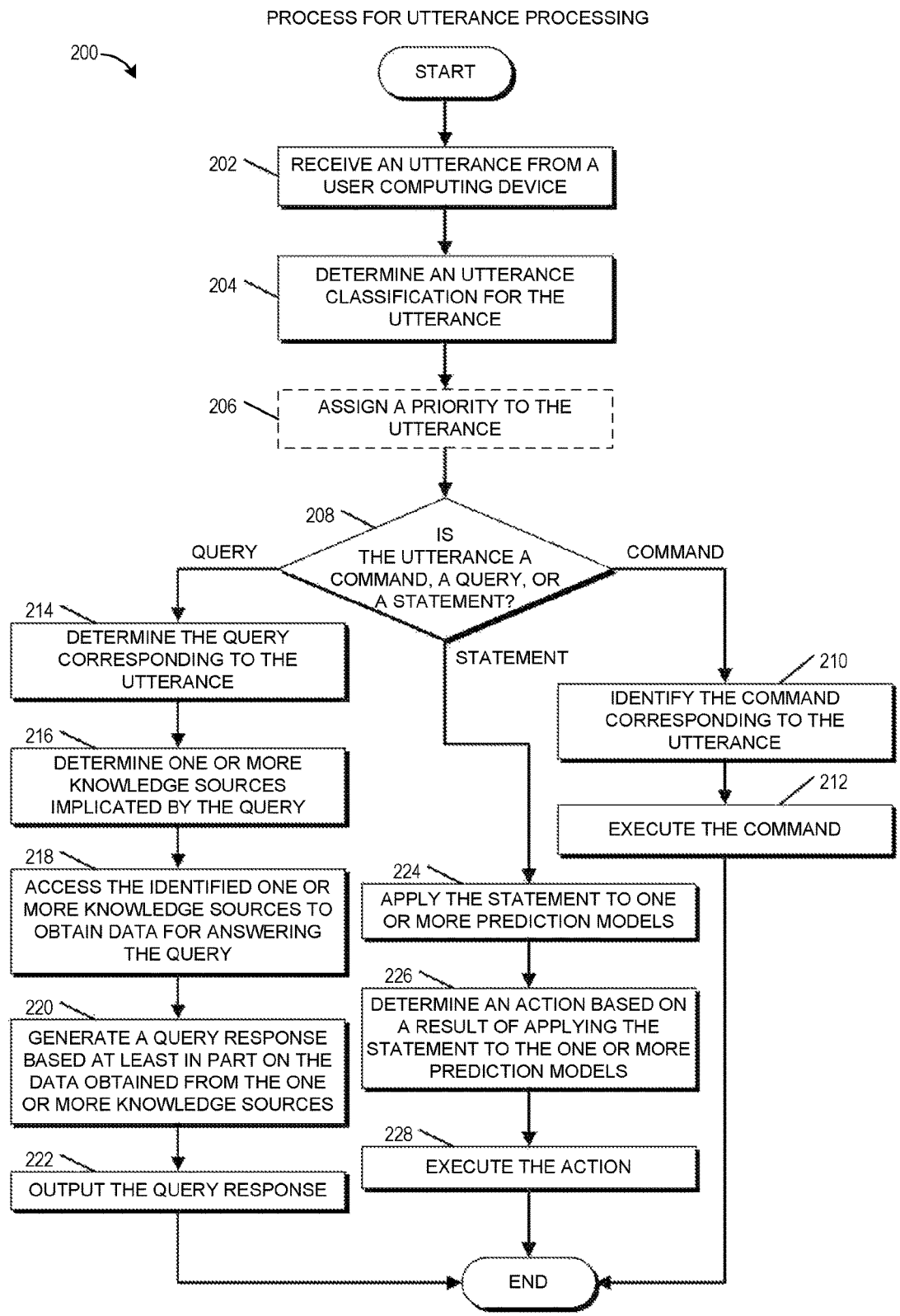
FIG. 2 presents a flowchart of an embodiment of a process for utterance processing.

FIG. 2 presents a flowchart of an embodiment of a process for utterance processing 200. The process 200 can be implemented by any system that can receive one or more utterances from a user can determine a response or an action to take in response to the one or more utterances. The process 200, in whole or in part, can be implemented by, for example, an audio capture system 102, a companion application 106, an interactive computing environment 101, a dispatch system 116, a conversation manager 128, or a command execution system 122, among others. Although any number of systems, in whole or in part, can implement the process 200, to simplify discussion the process 200 will be described with respect to particular systems. Further, it should be understood that the process 200 may be repeated each time an utterance is received or may be performed in response to particular utterances or after a particular number of utterances are received. In some cases, the process 200 is performed in response to a trigger. For example, the process 200 may be performed in response to receiving a command from a user or in response to a user interacting with the companion application 106.

The process 200 begins at block 202 where the dispatch system 116 receives an utterance. The utterance may be received from an audio capture system 102 of a user computing system 110 or a user computing system 108. In some cases, the utterance may be received from a voice recognition system 114.

At block 204, the utterance classifier 118 determines an utterance classification for the utterance. The utterance classification can include a command, a query, or a statement. In some cases, the utterance classification may include an undetermined classification. For example, if the utterance classifier 118 is unable to determine whether the utterance is a command, a query, or a statement, the utterance may be classified as undetermined. If the utterance is undetermined, a message indicating as such or an error message may be transmitted to the user computing system 110 for presentation to a user. This error message may be presented to the user as visual or audio feedback, or a combination of visual and audio feedback.

At block 206, the utterance classifier 118 may assign a priority to the utterance. In some cases, based on the priority assigned to the utterance, it can be determined whether the utterance should continue to be processed in turn or whether the utterance should be processed subsequent to higher priority utterances. Further, in some cases, based on the priority assigned to the utterance, it can be determined whether the utterance should be provided to a secondary system for processing, which may take longer to process the utterance than the dispatch system 116. In some cases, the priority of the utterance is based on the utterance type. For example, a command may have higher priority that a query or a statement because the command is likely to alter the state of the video game 112. Conversely, a query may have higher priority than a command because a user may want to receive a response to a query quickly, but a result of a command received via the companion application 106 may not affect the user until the user elects to play a session of the video game 112. In certain embodiments, as indicated by the dashed line surrounding the block 206, the operations associated with the block 206 may be optional or omitted.

At decision block 208, the utterance classifier 118 determines whether the utterance is classified at the block 204 as a command, a query, or a statement. If it is determined that the utterance is classified as a command, the command manager 120 identifies the command corresponding to the utterance at block 210. The command manager 120 may identify the particular command corresponding to the utterance or referenced by the utterance by accessing a repository of commands stored at or available to the command manager 120. In some cases, the command manager 120 may store information associated with more common commands. In such cases, less common commands may not be recognized by the command manager 120. If the command is not recognized by the command manager 120, the utterance may be supplied to the context manager 134 which can access one or more knowledge repositories, such as the video game repository 147, to identify the command referenced in the utterance.

In some embodiments, the block 210 may include determining whether the identified command can be executed at the particular time period that the utterance was received or with respect to the current state of the video game 112. If it is determined that the command cannot be executed at the particular time or with respect to the current state of the video game 112, the command may be rejected. Rejecting the command may include alerting the user that the command cannot be executed.

The identified command may be supplied to a command execution system 122, which can execute the command at block 212. Executing the command may include executing the command with respect to the video game 112 hosted by an application host system 124. In some cases, executing the command 212 may be a multistep process. Executing the command may result in a state change of the video game 112. Generally, a query will not result in a state change of the video game 112. One non-limiting example of this multistep processes is described in further detail with respect to FIG. 3.

If it is determined at the decision block 208 that the utterance is a query, the query and statement manager 122 determines a particular query corresponding to the utterance at the block 214. In some embodiments, the block 214 may include determining whether the query is a rhetorical query. If the query is a rhetorical query, the process 200 may treat the query as a statement.

At the block 216, the knowledge manager 130 may determine one or more knowledge sources implicated by the query. In some embodiments, the knowledge sources may be one or more repositories, such as the video game repository 147. Alternatively, or in addition, the knowledge source may include the video game 112 itself. In some cases, the knowledge manager 130 may cause the video game 112 to be executed to determine a response to a query. For example, if a user asks whether the user's band of warriors can be sent to a particular village, the knowledge manager 130 may instantiate the video game 112 and load an account of the user's to determine whether the user has discovered the village, whether the user has enough in-game credits to purchase passage to the village, and/or whether the user's band of warriors is capable of leaving their current location without taking further action.

At block 218, the knowledge manager 130 may access the identified one or more knowledge sources to obtain data for answering the query. If data cannot be identified for answering the query, an error message stating as such may be supplied or transmitted to the user computing system 110 for presentation to the user.

At block 220, the response generator 138 generates a query response based at least in part on the data obtained from the one or more knowledge sources. In some embodiments, the response generator 138 may generate the query response based at least in part on previous utterances made by the user during the current session and/or during previous sessions interacting with the companion application 106 or the video game 112. For example, if the user has a history of longer engagement when a query response includes game-related humor, the response generator 128 may include game-related humor when generating the query response. Further, responses to commands or statements may similarly be customized based on user-detected preferences. In some embodiments, the user may specify response preferences. One non-limiting example of the query response generation processes described below with respect to FIG. 4.

At block 222, the user interface system 126 outputs the query response. Outputting the query response may include transmitting the query response to a user computing system 110, which can output the query response to a user. In some cases, the query response is output as audio. Alternatively, or in addition, the query response may be output as video or as an image. However, the present disclosure is not limited in the type of output that may be generated to the query response. For example, in some cases, the query response may be output as a physical response, such as by causing the user computing system 110, or an associate a gamepad, to vibrate. In some embodiments, the query response may be provide by the response generator 138 to the dispatch system 116, which can provide the response to the companion application 106, or the video game 112, for presentation to the user.

If it is determined at the decision block 208 that the utterance is a statement, the engagement system 140 applies the statement to one or more prediction models at block 224. In some embodiments, the statement may be applied in aggregate with other statements to the one or more prediction models. The statements may be aggregated by comparing the tone or sentiment of the statements in supplying an aggregated score corresponding to the toner sentiment of the statements to the prediction models. Further, in some embodiments, the block 224 may include applying one or more queries to the one or more prediction models.

At block 226, the response generator 138 determines an action based on a result of applying the statement to the one or more prediction models. In some embodiments, the one or more prediction models provide the action as output. In other embodiments, one or more potential actions are supplied to the prediction model as an input, and the prediction model outputs an engagement score for the response option. The response generator 138 may select an action or response option based on the generated engagement scores for the one or more potential actions. In some embodiments, one potential action may be to take no action. Other non-limiting examples of actions to take may include adjusting a difficulty level of the video game 112, selecting a different component or type of opponent, introducing more or less jokes into responses supplied in response to a query or statement, having shorter or longer conversations with the user, or any other type of action that may modify the engagement score of the user.

At block 228, the response generator 138 executes the action determined at the block 226. As previously mentioned, the action may include taking no action. In other words, in some cases, statements may not result in the performance of an action. In such cases, the block 228 may be omitted. In some cases, executing the action may include adjusting a state of the video game 112, such as by adjusting a difficulty level of the video game 112. Additionally, or alternatively, executing the action may include conversing with the user by, for example, outputting audio relating to one or more statements made by the user. For example, if the user makes a number of statements that indicate that the user is frustrated with a boss in the video game 112, the response generator 138 may generate an audio output telling the user: "Wow! You are doing great. I bet you will beat the boss next time." The response generator 138 may generate the audio output if the prediction model indicates that such an output is likely to increase the engagement level of the user. Alternatively, or in addition, the response generator 138 may adjust the state of the video game 112 to make the boss easier to defeat if the prediction model indicates that an adjustment to the difficulty of the video game 112 is likely to increase the engagement level of the user.

The utterances received at the block 202 may include any type of utterance relating to interacting with the video game 112 or relating to the video game 112. As previously described, the utterances can be commands that can adjust the game state of the video game 112, queries that ask for information about the video game 112, or statements that relate to the video game 112. Some non-limiting examples of utterances relating to the video game 112 that may be spoken by a user using the companion application 106 are listed below in Table 1. The first column in Table 1 lists potential topics for utterances. The second column in Table 1 lists potential utterances for each topic of column 1.

TABLE 1

| Subjects | Utterances |
| --- | --- |
| Club/Squad/team | How is my club (squad)? |
| | Describe my club |
| | How many (items, players, assets, etc.) are in my club? |
| | How can I improve my club? |
| | Best match for my squad? |
| | Reorganize my club? |
| | Chemistry of my squad? |
| | Best team squads? |
| | Cost of improving my squad? |

TABLE 1-continued

| Subjects | Utterances |
| --- | --- |
| | Boost my players with consumables (health boost, contract boost, weapon boost)? |
| Auction/Transfer | Search transfers for XXX. |
| | Tell me how much that player is going for on the auction house. |
| | Search transfer market. |
| | Best players in transfer market. |
| | Items at XXX price range. |
| | Items with specified attributes (style, position, origin, quality, etc.). |
| | Items I can purchase now. |
| | Place bid for item XXX. |
| | Update me on new bids for my items. |
| | Place in transfer target. |
| | Relist unsold items. |
| | Remove sold items. |
| | Buy now. |
| Tips/ Recommendations | Give me some tips. |
| | Tips to improve. |
| | Tips to get better. |
| | Practice matches. |
| | Recommended maps. |
| | Recommended items from store. |
| | Tell me which player to acquire to optimize my team. |
| | What is the best way to do XXX? |
| | What games should I play next? |
| | Recommend games for me? |
| Store | What packs are available? |
| | What is the value of XXX? |
| | Buy a gold/silver/bronze/etc. pack from the store. |
| | List all of the items in the market |
| Commands | What missions are available? Please send my team to X |
| | Buy a health pack and apply to player X |
| | Tell player X to come closer |
| | Assume a defensive/offensive/etc. arrangement. |
| User Feedback | My feedback is to XXX. |
| | I think you should add X |
| | I did not like X |
| | remove feature X |
| | add feature X |
| | The map needs more X |
| Player Stats | How many goals? |
| | How many hours played? |
| | My leaderboard position? |
| | My friends position in leaderboard? |
| | How many kills do I have? |
| | How many kills did I get? |
| | What is the number of kills? |
| | My kill death ratio? |
| | What is my kill death ratio? |
| | Which game have I been playing the most? |
| | Games played? |
| | Games played since {Date}? |
| | Games played on {Date}? |
| | What played since {Date}? |
| | What did I play on {Date}? |
| | What did I play in {Date}? |
| | What games played since {Date}? |
| | What games played {Date}? |
| | Which games played since {Date}? |
| | How much did I play {Game}? |
| | How much play {Game}? |
| | Have I played {Game}? |
| | Have I played {Game} since {Date}? |
| | When was the last time I played {Game}? |
| | When did I play {Game} last? |
| | Last time I played {Game}? |
| | Last play date for {Game}? |
| | Last time played? |
| | Last game played? |
| Social | My name is {name}. |
| | Ask my friend XXX. |
| | Any of my friends online? |
| | Message my friend XXX. |
| | Challenge my friend. |
| | Send gift to any friend. |

TABLE 1-continued

| Subjects | Utterances |
| --- | --- |
| News | What is new in {Game}?<br>Give me news for {Game}.<br>What is the latest in {Game}?<br>When will the new feature get released? |

As can be observed from the examples in Table 1, utterances may not be grammatically correct. Further, utterances that are queries may be spoken as statements or commands. Thus, in certain embodiments, the dispatch system 116 may determine the intent of the utterance using a combination of natural language processing and machine learning algorithms to determine the meaning of the utterance. Further, the conversation manager 128 may compare the utterance to a list of acceptable utterances and to historical utterances to derive the meaning of the utterance. In some embodiments, such as when the utterance is ambiguous, the conversation manager 128 may request that the user confirm whether the user's utterance matches the conversation manager's 128 identification of the utterance. In some embodiments, the conversation manager 128 may select the most likely meaning for the utterance based on historical use of the conversation manager 128.

Example Command Execution Process

Figure 3:
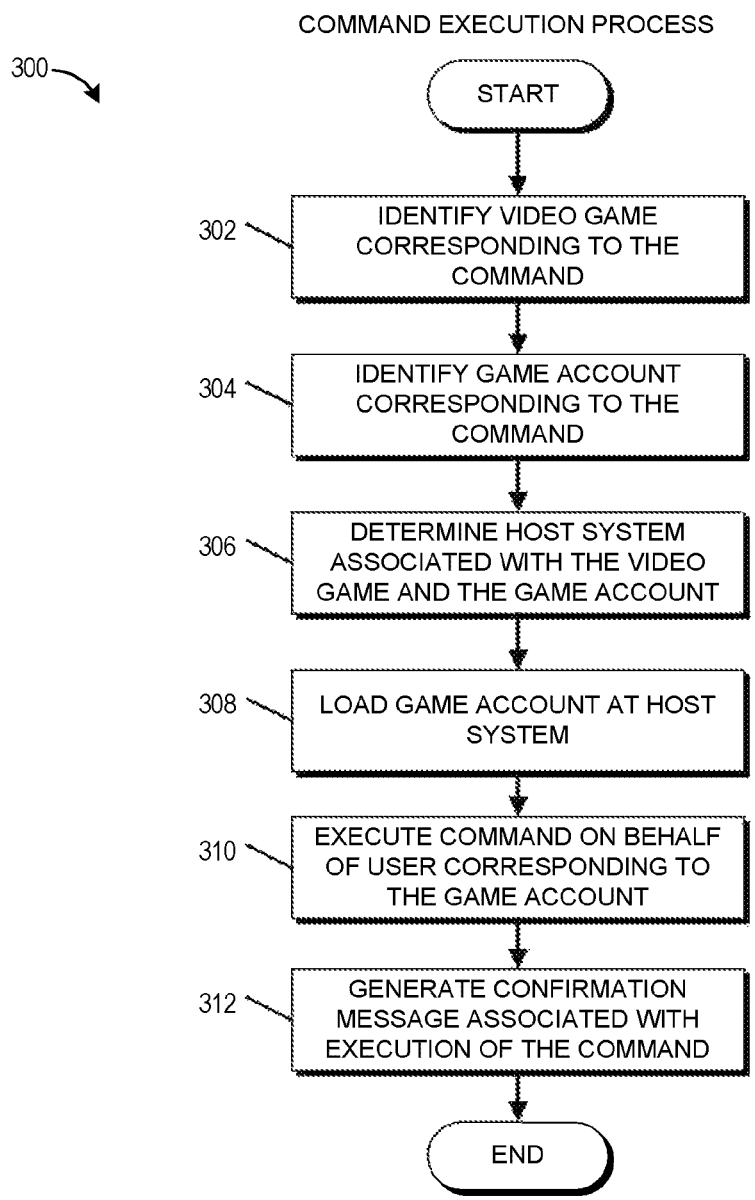
FIG. 3 presents a flowchart of an embodiment of a command execution process.

FIG. 3 presents a flowchart of an embodiment of a command execution process 300. The process 300 can be implemented by any system that can execute a command in a video game 112 in response to an utterance received from a user. The process 300, in whole or in part, can be implemented by, for example, an audio capture system 102, a companion application 106, an interactive computing environment 101, a dispatch system 116, a command manager 120, or a command execution system 122, among others. Although any number of systems, in whole or in part, can implement the process 300, to simplify discussion the process 300 will be described with respect to particular systems. Further, the process 300 may be performed each time a command is executed as part of the operations of the block 212.

The process 300 begins at block 302 where the command manager 120 identifies a video game 112 corresponding to a command identified based at least in part on a received utterance. In some cases, the video game 112 may be identified based at least in part on the received utterance. In other cases, the video game 112 may be identified by the companion application 106. The video game 112 may also be identified based on user account information, such as a user login. In some cases, a user login may be associated with a game service and thus, may not be specific to a particular video game. In such cases, additional information may be required to identify the video game 112, such as screenname associated with the user's game account. The user in some cases may specify the video game verbally or by interacting with a user interface of the companion application 106. In other cases, the companion application 106 may be specific to a particular video game 112 and thus, the video game 112 is automatically or inherently identified based on the user's interaction with the companion application 106. In some cases, the utterance is received by the video game 112 and thus, the video game 112 identifies itself.

At block 304, the command manager 120 identifies a game account corresponding to the command. The game account may be specific to the video game 112, the user, a character played by the user of the video game 112, or a save-file or game-profile on the video game 112. In some cases, the game account may include game account information associated with the game application. For example, the game account information may include user account information (such as username, display name, email domains, date of birth, answers to security questions), user authentication information (such as, username and password), game profile information (such as, for example, settings of multiple in-game user profiles), save game files, characteristics associated with in-game characters (such as, for example, character equipment, character level, achievements, and the like), or other information. The game account may include an account associated with the user who spoke the utterance. In some cases, the utterance may include an identity of the game account. In other cases, the game account may be identified based on a user login to the companion application 106 or the video game 112 occurring prior to receipt of the utterance.

At block 306, the command execution system 122 determines a host system associated with the video game 112 in the game account. The host system may include an application host system 124 is configured to execute at least a portion of the video game 112. In some cases, the host system may be a user computing system 108 is configured to execute at least a portion of the video game 112. The block 306 may include identifying a plurality of application host systems 124 that are configured to host the video game 112. A particular application host system 124 may then be selected from the plurality of application host systems 124 based at least in part on the game account associated with the user that provided the utterance.

In some embodiments, the system identified at the block 306 hosts a supporting component of the video game rather than the video game itself. For example, if the command relates to trading at an auction house associated with the video game 112, the system identified at the block 306 may be an application host system dedicated to hosting the auction house for one or more instances of a persistent universe corresponding to the video game 112.

At block 308, the command execution system 122 loads a game account identified at the block 304 at the application host system 124. Loading the game account may include loading a particular save game or a particular profile for the video game 112 associated with the user. Further, loading the game account may include reverting or setting the video game 112 to a particular state associated with the user's play of the video game 112. The particular state of the video game 112 may correspond to the user's most recent play session of the video game 112. In some cases, the video game 112 may have changed since the user's most recent play session because, for example, the video game 112 includes a persistent world that is interacted with by other users. In some such cases, loading the game account may include loading a playable character associated with the user with respect to a particular portion of the video game 112.

In some embodiments, loading the game account may include instantiating a headless client configured to interact with the application host system 124 on behalf of the user. In some cases, the headless client may be configured to interact with the video game 112 at the application host system. Further, the block 308 may include executing the video game 112 or a portion of the video game 112. Executing the video game 112 may include causing the video game 112 to reach a particular state, such as a state corresponding to a user's progress within the video game 112 as identified based at least in part on the user's game account.

In some embodiments, the block 308 may include receiving user credentials that may be used to login to an instance of the video game 112 at the application host system 124. The user credentials may be received from a user computing system 108 or a user computing system 110. In some cases, a user account of the companion application 106 is paired with the user's account of the video game 112 at the application host system 124. In some such cases, it may be a necessary for the user to supply the user credentials to the video game 112 as the companion application 106 may automatically provide the user credentials to the video game 112.

At block 310, the command execution system 122 executes the command on behalf of the user corresponding to the game account identified at the block 304. Executing the command may include making one or more application programmer interface (API) calls. In some embodiments, the command may not be identified or maybe not be possible to execute the command because, for example, the current state of the video game 112 does not satisfy necessary conditions to execute the command. In some such cases, the requested command may be logged at the log repository 136. In some embodiments, the command may be executed at a future point in time when the video game 112 satisfies the necessary conditions for executing the command.

At block 312, the command execution system 122 generates a confirmation message associated with execution of the command. The confirmation message may indicate that the command was successfully executed. Alternatively, or in addition, the confirmation message may indicate the result of the command. For example, if the command is to sell a piece of armor at the auction house, the confirmation message may indicate the price obtained for the piece of armor upon completion of the sale of the auction house. Further, the confirmation message may indicate any state changes to the video game 112 as a result of executing the command.

The confirmation message may be provided to the companion application 106. The companion application 106 may cause the confirmation message to be output to a user on a display of the user computing system 110 and/or using speakers of the user computing system 110. If the command fails to execute, the confirmation message may indicate that the command felt execute and, in some cases, may present the reason for the failure and executing the command.

Example Engagement-Based Utterance Response Process

Figure 4:
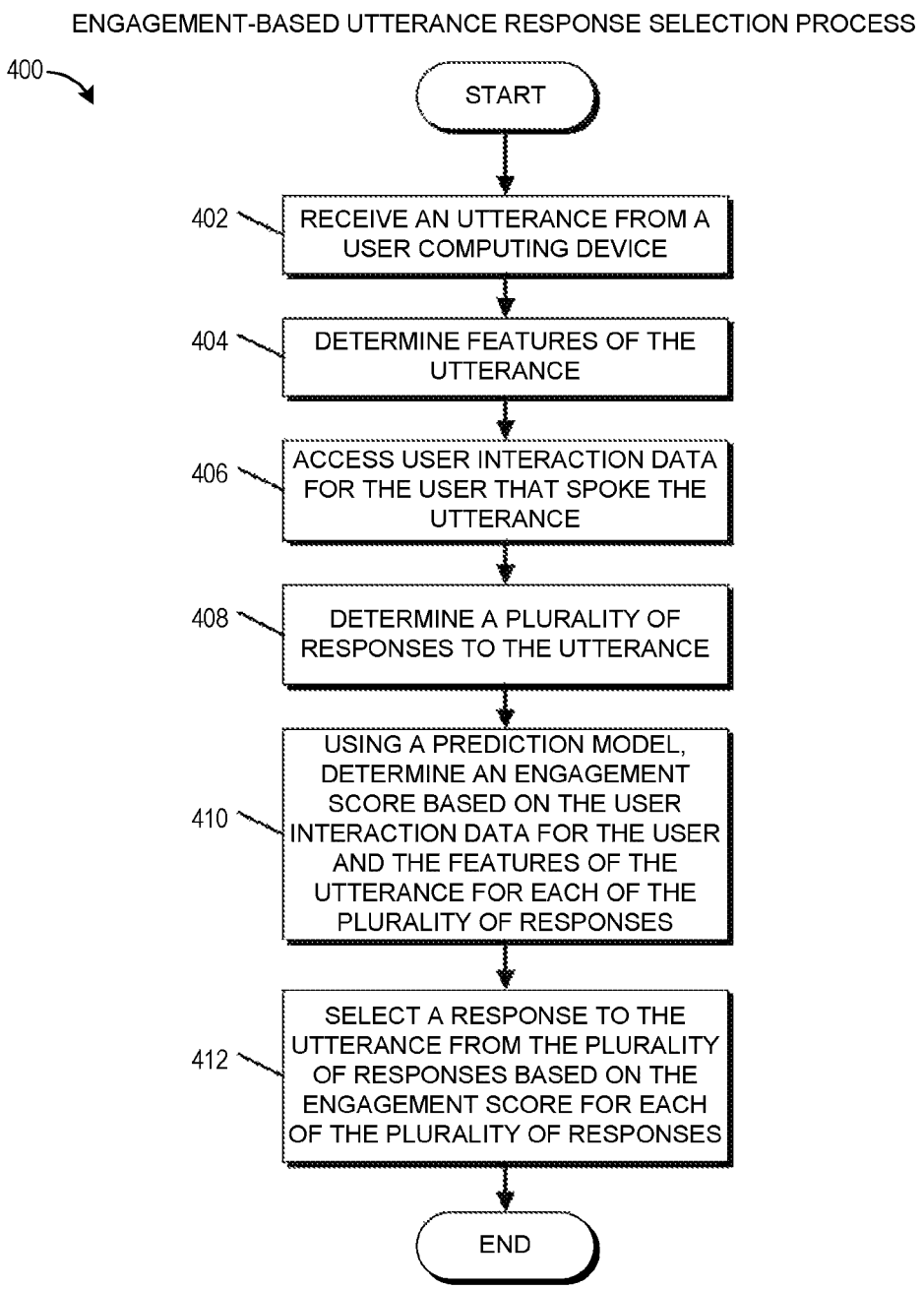
FIG. 4 presents a flowchart of an embodiment of an engagement-based utterance response selection process.

FIG. 4 presents a flowchart of an embodiment of an engagement-based utterance response selection process 400. The process 400 can be implemented by any system that can generate a response to an utterance. The process 400, in whole or in part, can be implemented by, for example, an audio capture system 102, a companion application 106, an interactive computing environment 101, a dispatch system 116, a command manager 120, a conversation manager 128, a response generator 138, or a command execution system 122, among others. Although any number of systems, in whole or in part, can implement the process 400, to simplify discussion the process 400 will be described with respect to particular systems. Further, the process 400 may be performed each time a query response is generated as part of the operations of the block 220. In some embodiments, the process 400 may be performed as part of a process for processing a statement or executing a command referenced by the utterance.

The process 400 begins at block 402 where the intent manager 132 receives an utterance that was received from a user computing device 110. The intent manager at block 404 determines features of the utterance. The features of the utterance may include a tone of the utterance and/or a sentiment of the utterance. To determine the features of the utterance, the intent manager may perform sentiment analysis and/or one or more other natural language processing algorithms. Further, in some embodiments, determining the features of the utterance may include determining whether the utterance is high pitch or low pitch, which may indicate whether the user is excited.

At block 406, the engagement system 140 accesses user interaction data for the user that spoke the utterance. This user interaction data may be stored at a user data repository 148. The user interaction data may include a history of past utterances made by the user with respect to the video game 112 or past utterances provided to the companion application 106 by the user.

At block 408, the response generator 138 determines a plurality of potential responses to the utterance received at the block 402. The plurality of potential responses to the utterance may be based at least in part on a response to a query determine from one or more knowledge sources, such as the video game repository 147 or the news service 143. Alternatively, or in addition, the plurality of potential responses to the utterance may be based on one or more statements made by the user.

In some cases, each of the plurality of responses may include the same or similar information. However, each of the plurality of potential responses may present the information differently. For example, each of the plurality of potential responses may have a different tone or a different length of response. As another example, some of the plurality of potential responses may include one or more jokes while other potential responses may not include jokes. In some cases, some of the plurality of responses to the utterance may include different information. For example, some responses may include more detailed information responsive to a user's query in some of the other potential responses.

Using a prediction model, the engagement system 140 determines an engagement score for each of the plurality of responses. The engagement score may be determined based at least in part on the user interaction data for the user obtained at the block 406 and/or the features of the utterance determined at the block 404. In some cases, along with a potential response to the utterance, the user interaction data and/or the features of the utterance may be supplied to the prediction model along with the utterance itself. The generated engagement score may indicate a level of engagement that is likely for the user if a particular response to an utterance is output to the user. For example, a response to an utterance with an engagement score of 80 may indicate that a user is more likely to be engaged and continue to interact with the companion application 106 and/or the video game 112 than a response to an utterance with an engagement score of 20.

At block 412, the response generator 138 selects a response to the utterance from the plurality of responses based on the engagement score for each of the plurality of responses. The response to the utterance may be output as a query response. Alternatively, or in addition, the response to the utterance may be based on one or more statement utterances made by the user.

In some cases, the utterance response may be responsive to a command spoken by the user. For example, a user may utter a command to reconfigure a squad of players on the user's soccer team in a soccer video game 112. The plurality of potential responses may include a short statement indicating that the soccer team has been reconfigured, a longer statement including a joke and indicating that the soccer team is being reconfigured, or a longer statement confirming the reconfiguration of the soccer team and providing information about how the reconfigured soccer team is likely to impact the result of the next match. Based on the generated engagement scores for the different potential responses to the command, the response generator 138 can determine whether to output the short statement, the longer statement with the joke, or the longer statement with additional details about the user's soccer team.

Example Prediction Model Generation Process

Figure 5:
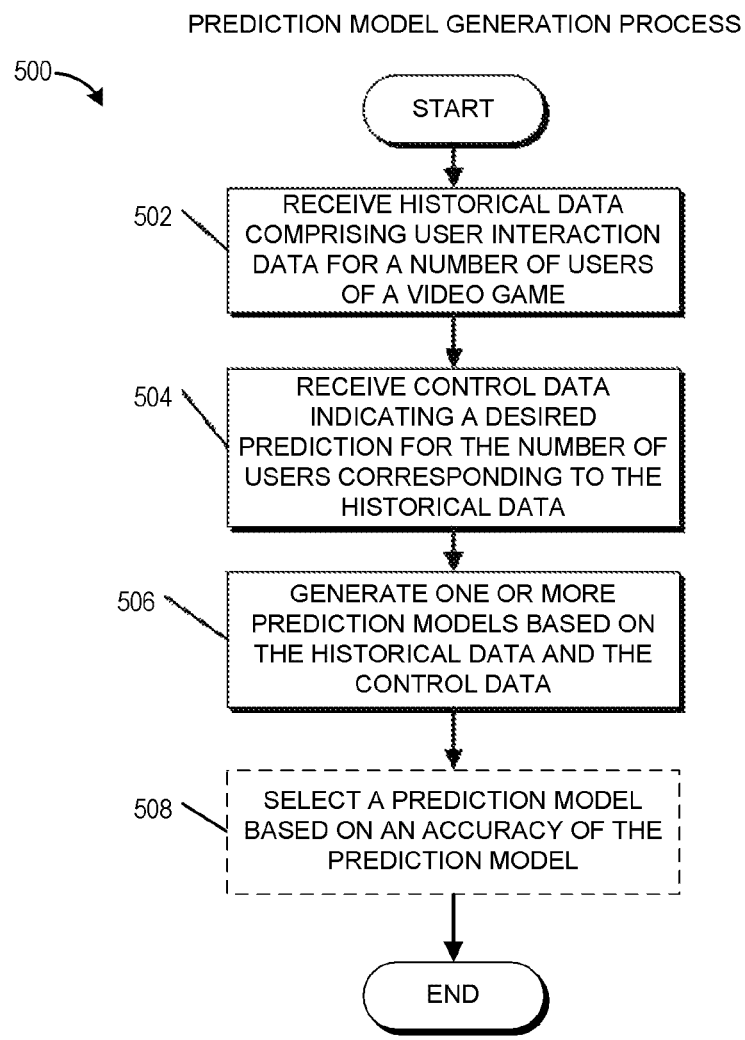
FIG. 5 presents a flowchart of an embodiment of a prediction model generation process.

FIG. 5 presents a flowchart of an embodiment of a prediction model generation process. The process 500 can be implemented by any system that can generate one or more parameter functions or prediction models that include one or more parameters. In some cases, the process 500 serves as a training process for developing one or more parameter functions or prediction models based on historical data or other known data. The process 500, in whole or in part, can be implemented by, for example, an interactive computing environment 101, an engagement system 140, a model generation system 146, or a user computing system 110, among others. Although any number of systems, in whole or in part, can implement the process 500, to simplify discussion, the process 500 will be described with respect to particular systems. Further, it should be understood that the process 500 may be updated or performed repeatedly over time. For example, the process 500 may be repeated once per month, with the addition or release of a new video game, or with the addition of a threshold number of new users available for analysis or who are playing a video game 112. However, the process 500 may be performed more or less frequently.

The process 500 begins at block 502 where the model generation system 146 receives historical data 152 comprising user interaction data for a number of users of the video game 112. The user interaction data may comprise utterances received from the user via the companion application 106 or the video game 112. This historical data 152 may serve as training data for the model generation system 146 and may further include user demographics or characteristics, such as age, geographic location, gender, or socioeconomic class. Alternatively, or in addition, the historical data 152 may include information relating to a play style of one or more users; the amount of money spent playing the video game 112; user success or failure information with respect to the video game 112 (for example, a user win ratio); a play frequency of playing the video game 112; a frequency of using particular optional game elements (for example, available boosts, level skips, in-game hints, power ups, and the like); the amount of real money (for example, U.S. dollars or European euros) spent purchasing in-game items for the video game 112; and the like. In addition, the historical data 152 may include data relating to one or more other users who played the video game 112 with a user from the number of users. In some cases, the historical data 152 may comprise user interaction data and other user or video game related data for multiple sets of users where each set includes a group of users that play a multiplayer instance of a video game together as opponents, teammates, or both. The user or video game data may include not only the above-mentioned data, but also skill information for each user with respect to the video game 112 and/or one or more actions that can be performed in the video game 112 and/or one or more elements (such as levels or obstacles) of the video game 112. In addition, the data may include in-game character selection preferences, role preferences, and other information that can be used to distinguish play styles, preferences, or skills of different users.

At block 504, the model generation system 146 receives control data 156 indicating a desired prediction criteria corresponding to the historical data 152. This control data 156 may indicate one or more features or characteristics for which the model generation system 146 is to determine a model. Alternatively, or in addition, the control data 156 may include a value for the features or characteristics that are associated with the received historical data 152. For example, the control data 156 may identify engagement level, churn rate, or retention rate, as the desired feature to be predicted by the model that is to be generated by the model generation system 146. The engagement level may indicate how long a user is likely to play the video game 112 or how likely the user is to play additional game sessions of the video game 112 within a particular period of time. The churn rate or retention rate may correspond to a percentage of users associated with the historical data 152 that ceased playing the video game 112. Further, the control data 156 may identify a retention rate associated with the historical data. For example, the control data 156 may indicate that the retention rate is 60% for certain of the users whose data is included in the historical data 152. In some embodiments, the control data 156 may include multiple characteristics or features to be predicted by the model to be generated by the model generation system 146. For example, the control data 156 may identify, for the users whose data was provided as the historical data 152, both a retention rate and a reason for the retention rate (such as the skill level of the opponents diverging by more than a threshold skill delta, or a higher than threshold percentage of the teammates and/or opponents quitting an instance of the video game 112 before the match is completed), or a retention rate and an average monetary amount spent by the users whose data was provided as the historical data 152.

At block 506, the model generation system 146 generates one or more prediction models 160 based on the historical data 152 and the control data 156. The prediction models 160 may include one or more variables or parameters 162 that can be combined using a mathematical algorithm or model generation ruleset 170 to generate a prediction model 160 based on the historical data 152 and, in some cases, the control data 156. Further, in certain embodiments, the block 506 may include applying one or more feedback data 154. For example, if the prediction model 160 is generated as part of a supervised machine learning process, a user (for example, an administrator) may provide one or more inputs to the model generation system 146 as the prediction model 160 is being generated and/or to refine the prediction model 160 generation process. For example, the user may be aware that a particular region or geographic area had a power outage. In such a case, the user may supply feedback data 154 to reduce the weight of a portion of the historical data 152 that may correspond to users from the affected geographic region during the power outage. Further, in some cases, one or more of the variables or parameters may be weighted using, for example, weights 164. The value of the weight for a variable may be based at least in part on the impact the variable has in generating the prediction model 160 that satisfies, or satisfies within a threshold discrepancy, the control data 156 and/or the historical data 152. In some cases, the combination of the variables and weights may be used to generate a prediction model 160.

The model generation system 146, at block 508, based at least in part on an accuracy of the prediction model 160 and, optionally, any associated penalty or weighting selects a prediction model 160. In some embodiments, the model generation system 146 selects a prediction model 160 associated with a lower penalty compared to another prediction model 160. However, in some embodiments, the model generation system 146 may select a prediction model associated with a higher penalty if, for example, the output of the prediction model 160 is a threshold degree more accurate than the prediction model associated with the lower penalty. In certain embodiments, the block 508 may be optional or omitted. For example, in some cases, the prediction models 160 may not be associated with a penalty. In some such cases, a prediction model may be selected from a plurality of prediction models based on the accuracy of the output generated by the prediction model or may be selected at random.

Overview of Computing System

Figure 6:
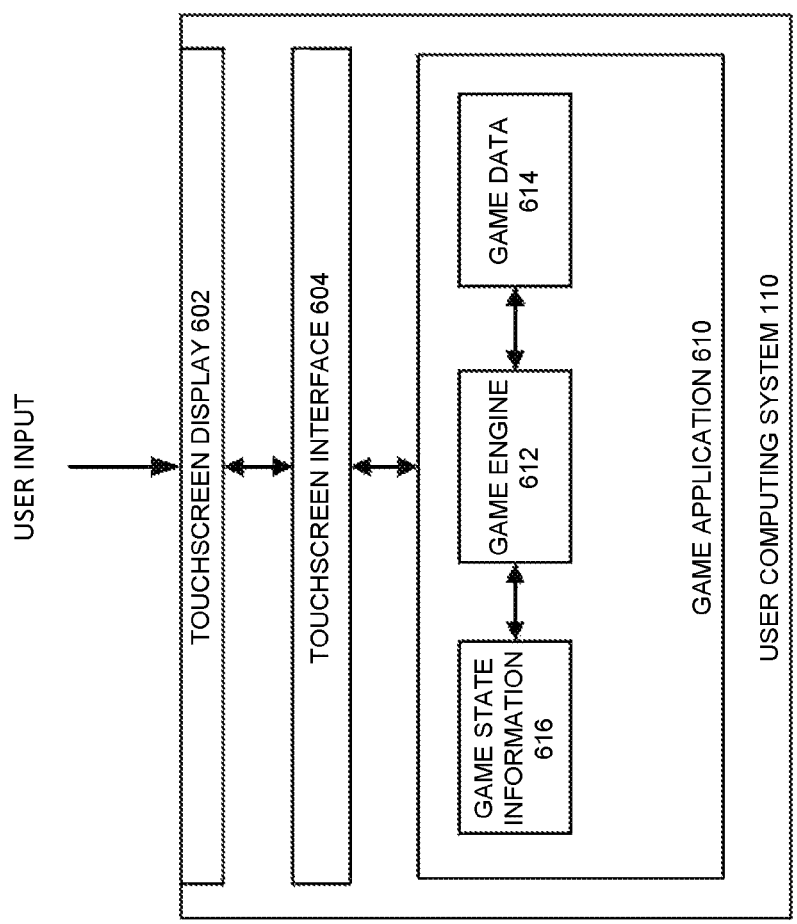
FIG. 6 illustrates an embodiment of a user computing system.

FIG. 6 illustrates an embodiment of a user computing system 110, which may also be referred to as a gaming system. Although FIG. 6 is specific to the user computing system 110, it should be understood that the user computing system 108 may have the same or a similar configuration. Alternatively, the user computing system 108 may have a different configuration than the user computing system 110. As illustrated, the user computing system 110 may be a single computing device that can include a number of elements. However, in some cases, the user computing system 110 may include multiple devices. For example, the user computing system 110 may include one device that includes a central processing unit and a graphics processing unit, another device that includes a display, and another device that includes an input mechanism, such as a keyboard or mouse.

The user computing system 110 can be an embodiment of a computing system that can execute a game system. In the non-limiting example of FIG. 6, the user computing system 110 is a touch-capable computing device capable of receiving input from a user via a touchscreen display 602. However, the user computing system 110 is not limited as such and may include non-touch capable embodiments, which do not include a touchscreen display 602.

The user computing system 110 includes a touchscreen display 602 and a touchscreen interface 604, and is configured to execute a game application. This game application may be the companion application 106, a video game 112, or an application that executes in conjunction with or in support of the companion application 106 or the video game 112, such as an application execution environment or a video game execution environment. Although described as a game application 112, in some embodiments the application 112 may be another type of application that may be capable of interacting with multiple users across multiple user computing systems, such as educational software or language software. While user computing system 110 includes the touchscreen display 602, it is recognized that a variety of input devices may be used in addition to or in place of the touchscreen display 602.

The user computing system 110 can include one or more processors, such as central processing units (CPUs), graphics processing units (GPUs), and accelerated processing units (APUs). Further, the user computing system 110 may include one or more data storage elements. In addition, the user computing system 110 may include one or more volatile memory elements, such as random-access memory (RAM). In some embodiments, the user computing system 110 can be a specialized computing device created for the purpose of executing game applications 112. For example, the user computing system 110 may be a video game console. The game applications 112 executed by the user computing system 110 may be created using a particular application programming interface (API) or compiled into a particular instruction set that may be specific to the user computing system 110. In some embodiments, the user computing system 110 may be a general purpose computing device capable of executing game applications 112 and non-game applications. For example, the user computing system 110 may be a laptop with an integrated touchscreen display or desktop computer with an external touchscreen display. Components of an example embodiment of a user computing system 110 are described in more detail with respect to FIG. 6.

The touchscreen display 602 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 602. The touchscreen interface 604 can be configured to translate the touch input into data and output the data such that it can be interpreted by components of the user computing system 110, such as an operating system and the game application 112. The touchscreen interface 604 can translate characteristics of the tactile touch input touch into touch input data. Some example characteristics of a touch input can include, shape, size, pressure, location, direction, momentum, duration, and/or other characteristics. The touchscreen interface 604 can be configured to determine the type of touch input, such as, for example a tap (for example, touch and release at a single location) or a swipe (for example, movement through a plurality of locations on touchscreen in a single touch input). The touchscreen interface 604 can be configured to detect and output touch input data associated with multiple touch inputs occurring simultaneously or substantially in parallel. In some cases, the simultaneous touch inputs may include instances where a user maintains a first touch on the touchscreen display 602 while subsequently performing a second touch on the touchscreen display 602. The touchscreen interface 604 can be configured to detect movement of the touch inputs. The touch input data can be transmitted to components of the user computing system 110 for processing. For example, the touch input data can be transmitted directly to the game application 112 for processing.

In some embodiments, the touch input data can undergo processing and/or filtering by the touchscreen interface 604, an operating system, or other components prior to being output to the game application 112. As one example, raw touch input data can be captured from a touch input. The raw data can be filtered to remove background noise, pressure values associated with the input can be measured, and location coordinates associated with the touch input can be calculated. The type of touch input data provided to the game application 112 can be dependent upon the specific implementation of the touchscreen interface 604 and the particular API associated with the touchscreen interface 604. In some embodiments, the touch input data can include location coordinates of the touch input. The touch signal data can be output at a defined frequency. Processing the touch inputs can be computed many times per second and the touch input data can be output to the game application for further processing.

A game application 112 can be configured to be executed on the user computing system 110. The game application 112 may also be referred to as a video game, a game, game code and/or a game program. A game application should be understood to include software code that a user computing system 110 can use to provide a game for a user to play. A game application 112 might comprise software code that informs a user computing system 110 of processor instructions to execute, but might also include data used in the playing of the game, such as data relating to constants, images and other data structures. For example, in the illustrated embodiment, the game application includes a game engine 612, game data 614, and game state information 616. As previously stated, the embodiments described herein may be used for applications other than video games, such as educational software or videoconferencing. Thus, in some such cases, the game application 112 may be substituted with other types of applications that may involve multiple users communicating over a network and selecting a server, or one of the plurality of user computing systems, to act as a host.

The touchscreen interface 604 or another component of the user computing system 110, such as the operating system, can provide user input, such as touch inputs, to the game application 112. In some embodiments, the user computing system 110 may include alternative or additional user input devices, such as a mouse, a keyboard, a camera, a game controller, and the like. Further, the user computing system 110 may include a virtual reality display and/or an augmented reality display. A user can interact with the game application 112 via the touchscreen interface 604 and/or one or more of the alternative or additional user input devices. The game engine 612 can be configured to execute aspects of the operation of the game application 112 within the user computing system 110. Execution of aspects of gameplay within a game application can be based, at least in part, on the user input received, the game data 614, and game state information 616. The game data 614 can include game rules, prerecorded motion capture poses/paths, environmental settings, constraints, animation reference curves, skeleton models, and/or other game application information. Further, the game data 614 may include information that is used to set or adjust the difficulty of the game application 112.

The game engine 612 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 112, the game application 112 can store game state information 616, which can include character states, environment states, scene object storage, and/or other information associated with a state of execution of the game application 112. For example, the game state information 616 can identify the state of the game application at a specific point in time, such as a character position, character action, game level attributes, and other information contributing to a state of the game application.

The game engine 612 can receive the user inputs and determine in-game events, such as actions, collisions, runs, throws, attacks and other events appropriate for the game application 112. During operation, the game engine 612 can read in game data 614 and game state information 616 in order to determine the appropriate in-game events. In one example, after the game engine 612 determines the character events, the character events can be conveyed to a movement engine that can determine the appropriate motions the characters should make in response to the events and passes those motions on to an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can be conveyed to a renderer, which can generate a new frame for display to the user. The process can be repeated for rendering each frame during execution of the game application. Though the process has been described in the context of a character, the process can be applied to any process for processing events and rendering the output for display to a user.

In some cases, at least some of the video game engine 612 may reside on a server, such as one of the video game servers 152. Further, in some cases, the complete video game engine 612 may reside on the server. Thus, in some cases, the video game engine 612 may be omitted from the portion of the video game application 112 hosted on the user computing system 110. Similarly, in some embodiments, video game state information 616 and video game data 614 may be hosted on a server in addition to or instead of on the user computing system 110. Further, in some cases, actions of the user performed within the video game application 112 may be transmitted to a server that is hosting a portion of the video game 112. The server may compute or determine the result of the user's interaction with respect to the video game application 112, such as collisions, attacks, or movements. The server may then send a result of the user's actions to the video game application 112 on the user computing system 110. The video game application 112 may then perform an action in response to the result, such as displaying the result to the user.

Example Hardware Configuration of Computing System

Figure 7:
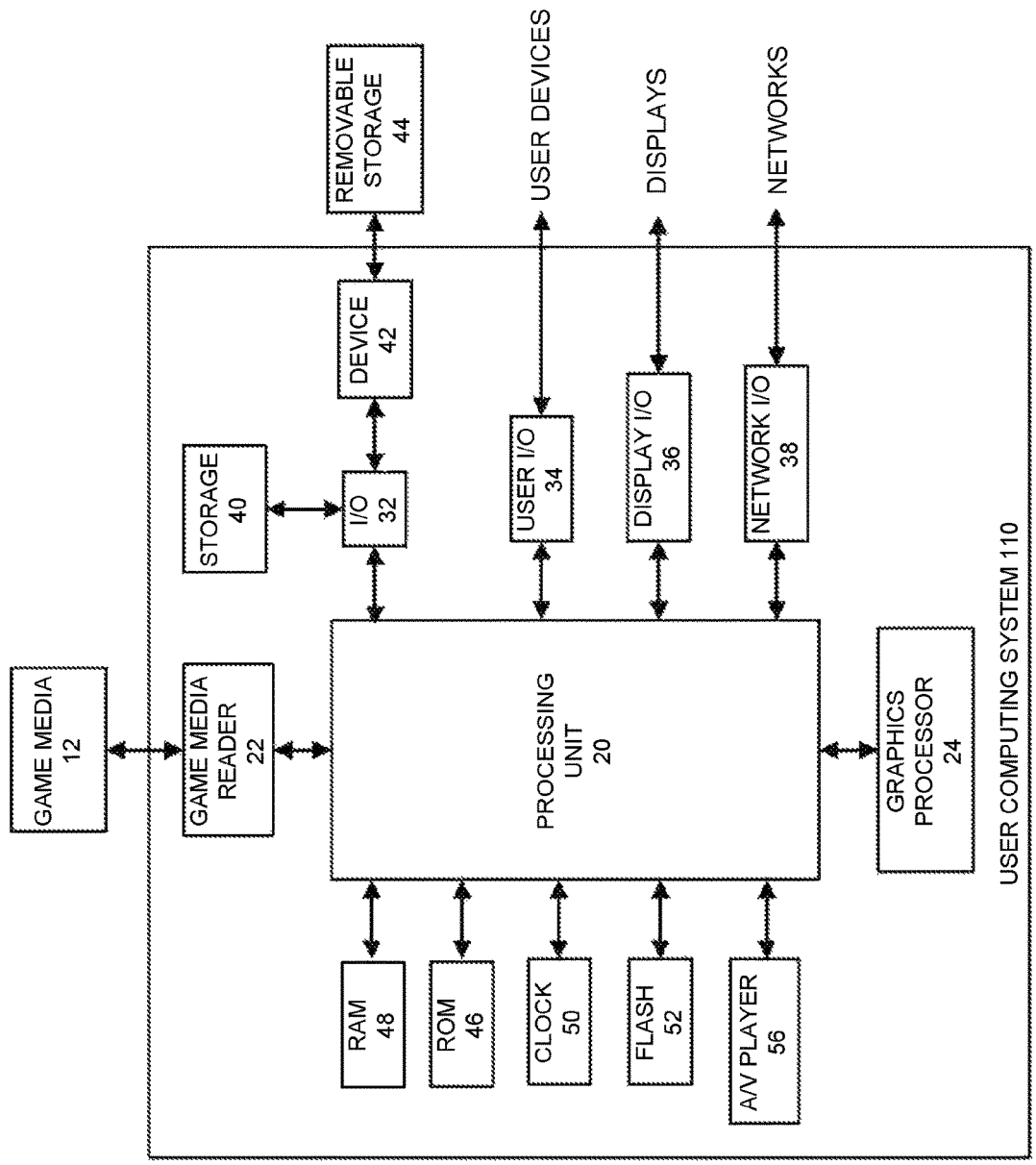
FIG. 7 illustrates an embodiment of a hardware configuration for the user computing system of FIG. 6.

FIG. 7 illustrates an embodiment of a hardware configuration for the user computing system 110 of FIG. 6. It should be understood that the user computing system 108 may be configured similarly or the same as the user computing system 110. Alternatively, the user computing system 108 may have a different configuration than the user computing system 110. Other variations of the user computing system 110 may be substituted for the examples explicitly presented herein, such as removing or adding components to the user computing system 110. The user computing system 110 may include a dedicated game device, a smart phone, a tablet, a personal computer, a desktop, a laptop, a smart television, a car console display, and the like. Further, (although not explicitly illustrated in FIG. 7) as described with respect to FIG. 6, the user computing system 110 may optionally include a touchscreen display 602 and a touchscreen interface 604.

As shown, the user computing system 110 includes a processing unit 20 that interacts with other components of the user computing system 110 and also components external to the user computing system 110. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The user computing system 110 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the user computing system 110 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The user computing system 110 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for the user computing system 110. Processing unit 20 can communicate through I/O 32 to store data, such as game state data and any shared data files. In addition to storage 40 and removable storage media 44, the user computing system 110 is also shown including ROM (Read-Only Memory) 46 and RAM 48. RAM 48 may be used for data that is accessed frequently, such as when a game is being played, or for all data that is accessed by the processing unit 20 and/or the graphics processor 24.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the user computing system 110 on a display device, such as graphics, user interfaces, video, and/or other visual content. The user computing system 110 may comprise one or more integrated displays configured to receive display output signals produced by the display I/O 36, which may be output for display to a user. According to some embodiments, display output signals produced by the display I/O 36 may also be output to one or more display devices external to the user computing system 110.

The user computing system 110 can also include other features that may be used with a game, such as a clock 50, flash memory 52, and other components. An audio/video player 56 might also be used to play a video sequence, such as a movie. It should be understood that other components may be provided in the user computing system 110 and that a person skilled in the art will appreciate other variations of the user computing system 110.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the user computing system 110 is turned off or loses power.

As user computing system 110 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
as implemented by an interactive computing system configured with specific computer-executable instructions,
receiving an utterance from a user computing device, the utterance comprising one or more spoken words associated with a video game and spoken by a user;
determining an utterance classification for the utterance; and
responsive to determining that the utterance classification corresponds to a command:
determining the command referenced by the utterance;
determining the video game associated with the command, the video game one of a plurality of video games;
identifying a user account associated with the user;
identifying a host system associated with the video game and the user account, the host system configured to host at least a first portion of an instance of the video game;
loading a user game account associated with the user account at the host system; and
executing the command on behalf of the user with respect to the user game account of the user at the host system without the user accessing the video game.

2. The computer-implemented method of claim 1, further comprising:
determining a priority of the utterance; and
processing the utterance in accordance with the priority of the utterance.

3. The computer-implemented method of claim 2, wherein processing the utterance in accordance with the priority of the utterance comprises providing the utterance to a secondary processing system to process the utterance when the priority is below a threshold priority.

4. The computer-implemented method of claim 1, wherein the utterance is received from a companion application hosted by the user computing device, the companion application distinct from but associated with the video game.

5. The computer-implemented method of claim 1, wherein executing the command on behalf of the user comprises:
instantiating a headless client configured to execute at least a second portion of the instance of the video game;
executing the second portion of the instance of the video game at the headless client; and
executing the command at the headless client.

6. The computer-implemented method of claim 1, wherein, responsive to determining that the utterance classification corresponds to a query, the method further comprises:
accessing one or more knowledge sources associated with the query, at least one of the one or more knowledge sources comprising a repository of game-state information;
generating a query response to the query based at least in part on data obtained from the one or more knowledge sources; and
transmitting the query response to the user computing device.

7. The computer-implemented method of claim 6, wherein generating the query response comprises:
- accessing user interaction data for the user;
- determining a plurality of eligible query responses based at least in part on the data obtained from the one or more knowledge sources;
- generating a score for each of the eligible query responses based on the user interaction data and a parameter function, the parameter function generated based at least in part on a machine learning algorithm; and
- selecting the query response from the plurality of eligible query responses based at least in part on the score for each of the eligible query responses.

8. The computer-implemented method of claim 7, further comprising determining one or more features of a signal corresponding to the utterance, wherein generating the score for each of the eligible query responses is further based on the one or more features of the signal corresponding to the utterance.

9. The computer-implemented method of claim 7, wherein selecting the query response from the plurality of eligible query responses comprises selecting the query response that has an engagement score that is greater than engagement scores of the remaining eligible query responses from the plurality of query responses.

10. The computer-implemented method of claim 1, wherein, responsive to determining that the utterance classification corresponds to a statement, further comprising:
- applying the statement to a parameter function to determine an action, wherein the action is selected from a plurality of actions to maintain or increase a level of engagement of the user with respect to the video game; and
- performing the action with respect to execution of the instance of the video game.

11. The computer-implemented method of claim 10, wherein applying the statement to the parameter function to determine the action comprises applying a plurality of statements corresponding to a plurality of utterances to the parameter function.

12. The computer-implemented method of claim 1, further comprising performing voice recognition on the utterance to determine the one or more spoken words.

13. A system comprising:
- an application host system configured to host at least a first portion of an instance of a video game;
- an interactive computing system comprising one or more hardware processors, the interactive computing system configured to execute specific computer-executable instructions to at least:
  - receive an utterance from a user computing device, the utterance associated with a video game and spoken by a user;
  - determine an utterance classification for the utterance;
  - responsive to determining that the utterance classification corresponds to a command:
    - determine the command referenced by the utterance;
    - determine the video game associated with the command, the video game one of a plurality of video games;
    - identify a user account associated with the user;
    - identify the application host system associated with the video game and the user account from a plurality of application host systems;
    - load a user game account associated with the user account at the application host system; and
    - execute the command on behalf of the user with respect to the user game account of the user at the application host system without the user accessing the video game.

14. The system of claim 13, wherein the interactive computing system is further configured to execute the command on behalf of the user by:
- instantiating a headless client configured to execute at least a second portion of the instance of the video game;
- executing the second portion of the instance of the video game at the headless client; and
- executing the command at the headless client.

15. The system of claim 13, wherein, responsive to determining that the utterance classification corresponds to a query, the interactive computing system is further configured to execute specific computer-executable instructions to at least:
- access one or more knowledge sources associated with the query;
- generate a query response to the query based at least in part on data obtained from the one or more knowledge sources; and
- transmit the query response to the user computing device.

16. The system of claim 15, wherein the interactive computing system is further configured to generate the query response by:
- accessing user interaction data for the user;
- determining a plurality of eligible query responses based at least in part on the data obtained from the one or more knowledge sources;
- generating a score for each of the eligible query responses based on the user interaction data and a parameter function, the parameter function generated based at least in part on a machine learning algorithm; and
- selecting the query response from the plurality of eligible query responses based at least in part on the score for each of the eligible query responses.

17. The system of claim 13, wherein, responsive to determining that the utterance classification corresponds to a statement, the interactive computing system is further configured to execute specific computer-executable instructions to at least:
- apply the statement to a parameter function to determine an action; and
- perform the action with respect to execution of the instance of the video game.

18. The system of claim 17, wherein the interactive computing system is further configured to apply the statement to the parameter function by:
- receiving a plurality of statements, including the statement, from the user computing device;
- determining a sentiment of each of the plurality of statements;
- aggregating the sentiments of each of the plurality of statements to obtain an aggregated sentiment; and
- providing the aggregated sentiment to the parameter function.

19. A non-transitory computer-readable storage medium storing computer executable instructions that, when executed by one or more computing devices, configure the one or more computing devices to perform operations comprising:
- receiving an utterance from a user computing device, the utterance associated with a video game;
- determining that an utterance classification corresponds to a command;
- identifying the command referenced by the utterance;

identifying a user account of the video game that corresponds to an identifier received with the utterance;

selecting a host system for the video game based at least in part on the user account, the host system configured to host at least a first portion of an instance of the video game;

loading game data associated with the user account at the host system; and executing the command on the instance of the video game at the host system on behalf of a user associated with the user account without the user accessing the video game.

20. The computer-readable, non-transitory storage medium of claim 19, wherein executing the command comprises:

instantiating a headless client configured to execute at least a second portion of the instance of the video game;

executing the second portion of the instance of the video game at the headless client; and executing the command at the headless client.

* * * * *